United States Patent
Nakae et al.

(10) Patent No.: US 7,890,251 B2
(45) Date of Patent: Feb. 15, 2011

(54) ONBOARD INFORMATION TERMINAL AND MAP INFORMATION PROVIDING APPARATUS AND MAP INFORMATION PROVIDING SYSTEM USING THEM

(75) Inventors: Tomohiro Nakae, Tokyo (JP); Masaharu Umezu, Tokyo (JP); Tomoya Ikeuchi, Tokyo (JP); Yasushi Kodaka, Tokyo (JP); Makoto Mikuriya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 448 days.

(21) Appl. No.: 11/990,761

(22) PCT Filed: Jun. 22, 2007

(86) PCT No.: PCT/JP2007/062616

§ 371 (c)(1),
(2), (4) Date: Feb. 21, 2008

(87) PCT Pub. No.: WO2008/044373

PCT Pub. Date: Apr. 17, 2008

(65) Prior Publication Data

US 2010/0223000 A1    Sep. 2, 2010

(30) Foreign Application Priority Data

Oct. 10, 2006    (JP) .............................. 2006-276640

(51) Int. Cl.
    *G01C 21/00* (2006.01)
(52) U.S. Cl. .................. 701/201; 701/207; 701/209; 701/211; 340/995.19; 340/995.22; 340/995.25
(58) Field of Classification Search ................ 701/201, 701/207, 208, 209, 211, 212, 214; 340/988, 340/990, 995.17–995.19, 995.22, 995.25; 382/113
    See application file for complete search history.

(56) References Cited

U.S. PATENT DOCUMENTS

| 6,184,823 B1 * | 2/2001 | Smith et al. ............. 342/357.13 |
| 6,351,707 B1 * | 2/2002 | Ichikawa ..................... 701/209 |
| 6,430,499 B1 * | 8/2002 | Nakano et al. .............. 701/208 |
| 7,613,331 B2 * | 11/2009 | Maeda ........................ 382/113 |

FOREIGN PATENT DOCUMENTS

JP     06-088733 A    3/1994

(Continued)

*Primary Examiner*—Gertrude Arthur Jeanglaud
(74) *Attorney, Agent, or Firm*—Birch, Stewart, Kolasch & Birch, LLP

(57) ABSTRACT

A map information providing system has a map information providing apparatus 1 and an onboard information terminal 3. The map information providing apparatus 1 selects a road represented by the coordinate point string data indicating a newly established road in accordance with distribution request information obtained from the onboard information terminal, and distributes the distribution road information containing the coordinate point string data about the road selected to the onboard information terminal. The onboard information terminal obtains the distribution road information containing the coordinate point string data from the map information providing apparatus, and generates, in the same format at least in part as the map information, road data for adding a new road to a road network represented by the map information stored in a map information storing section from the coordinate point string data contained in the distribution road information obtained, and generates new map information from the road data and map information.

23 Claims, 12 Drawing Sheets

FOREIGN PATENT DOCUMENTS

| | | |
|---|---|---|
| JP | 11-95657 A | 4/1999 |
| JP | A 2000-258176 | 9/2000 |
| JP | A 2001-194163 | 7/2001 |
| JP | 2002-328033 A | 11/2002 |
| JP | 2004-251945 A | 9/2004 |
| JP | 2006-064632 A | 3/2006 |
| JP | 2006-125883 A | 5/2006 |
| WO | WO-2004/008073 A1 | 1/2004 |
| WO | WO-2006/087933 A1 | 8/2006 |

* cited by examiner

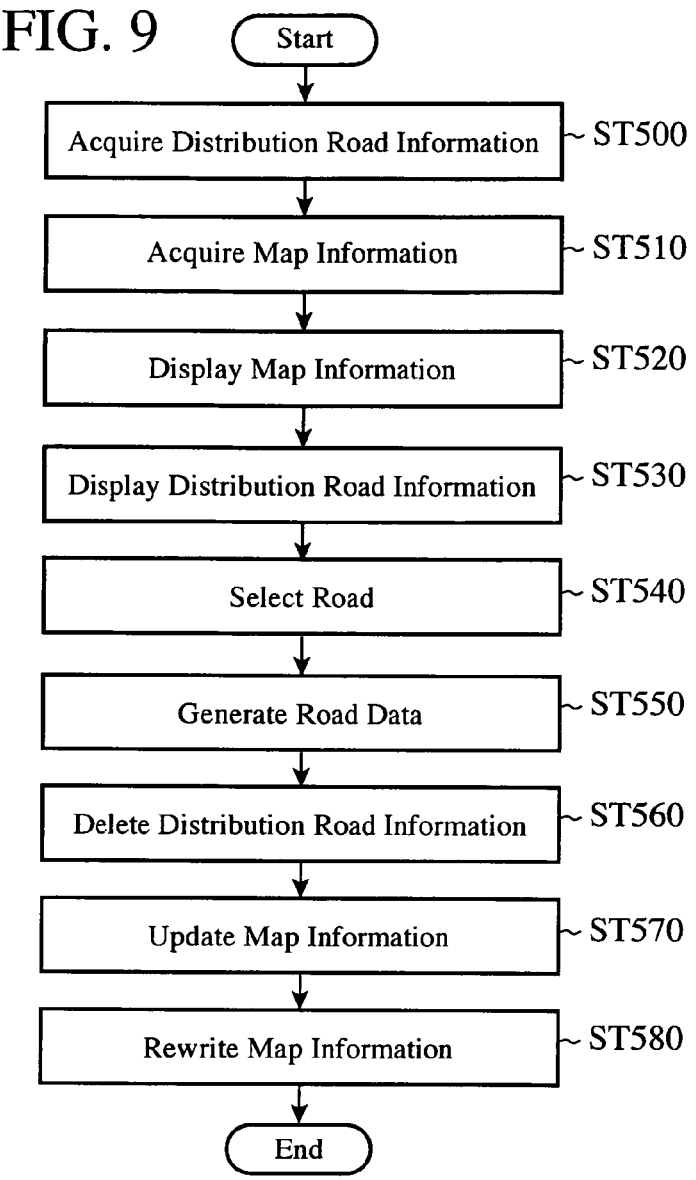
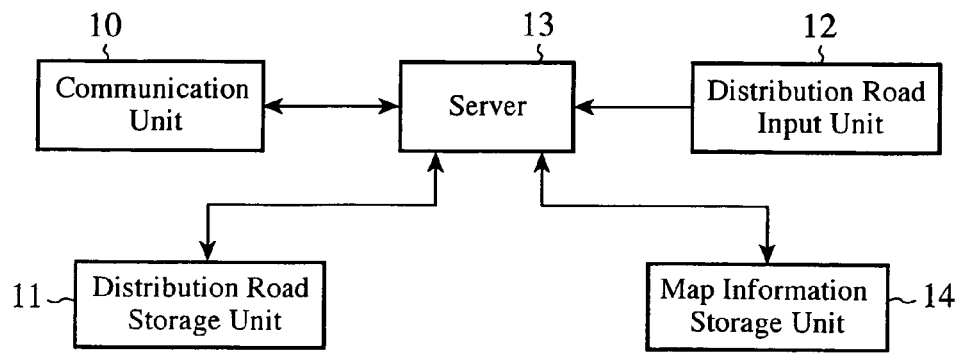

US 7,890,251 B2

ONBOARD INFORMATION TERMINAL AND MAP INFORMATION PROVIDING APPARATUS AND MAP INFORMATION PROVIDING SYSTEM USING THEM

TECHNICAL FIELD

The present invention relates to an onboard information terminal and a map information providing apparatus and a map information providing system using them, and particularly to a technique of updating map data by detecting a new road.

BACKGROUND ART

Conventionally, a map updating method is known which automatically detects a road not present in map data, updates the map data at necessary timing, and offers to a user as common map data (see Patent Document 1, for example). In the technique disclosed in Patent Document 1, when a vehicle loaded with a navigation apparatus travels a new road not present in map information of the navigation apparatus, the traveled course by the vehicle is transmitted to a map information providing apparatus. If the map information providing apparatus finds the road corresponding to the traveled course in its map information, it transmits the map information to the navigation apparatus. The navigation apparatus updates the map information it possesses up to that time to the map information received from the information providing apparatus, thereby obtaining the map information including the new road.

In addition, a Patent Document 2 discloses a dynamic map data updating system that is configured in such a manner as to enable a navigation apparatus to display the latest update map data via a downlink. The technique disclosed in the Patent Document 2 detects that the vehicle loaded with the navigation apparatus travels a new road not included in the map data file of the navigation apparatus from a failure of map matching, and transmits its traveled course to the map information providing apparatus. The map information providing apparatus searches accumulated route information for the route information corresponding to the received traveled course, and sends the route information found back to the navigation apparatus. The navigation apparatus displays the route information sent back as a new road.

Patent Document 1: Japanese Patent Laid-Open No. 2001-194163.

Patent Document 2: Japanese Patent Laid-Open No. 2000-258176.

However, in the technique disclosed in the foregoing Patent Document 1, since the navigation apparatus uses the map information by downloading it from the map information providing apparatus, if the data format of the map information of the navigation apparatus differs from that of the map information of the map information providing apparatus, the navigation apparatus cannot use the map information it downloads from the map information providing apparatus, and this presents a problem of being unable to update the map information.

In addition, as for the navigation apparatus disclosed in the foregoing Patent Document 2, since it cannot update the map data file using the route information sent back from the map information providing apparatus, it has a problem of being unable to add the new road to the map data file. Furthermore, although the vehicle detects that it travels a new road not included in the map data file from the failure of the map matching, since the map data file used for the map matching is not updated as described above, the navigation apparatus has a problem in that it must acquire the same route information from the map information providing apparatus every time it travels the same road not included in the map data file.

The present invention is implemented to solve the foregoing problems. Therefore it is an object of the present invention to provide an onboard information terminal and map information providing apparatus and map information providing system using them capable of updating the map data independently of the data format of the map information.

DISCLOSURE OF THE INVENTION

To solve the foregoing problems, the onboard information terminal in accordance with the present invention includes: a map information storing section for storing map information; a distribution information acquiring section for obtaining, from outside, distribution road information containing coordinate point string data consisting of a series of coordinate points indicating geographical positions; a road data generating section for generating, in the same format at least in part as the map information, road data for adding a new road to a road network, which is represented by the map information stored in the map information storing section, from the coordinate point string data contained in the distribution road information obtained by the distribution information acquiring section; and a map information update section for generating new map information from the road data generated by the road data generating section and the map information stored in the map information storing section.

The map information providing apparatus in accordance with the present invention includes: a distribution request information acquiring section for obtaining distribution request information which is transmitted from outside and contains one of present position data indicating a present position, area data indicating an area including a desired road, and road designating data indicating a road to be designated for indicating a desired area; a distribution road storing section for storing coordinate point string data representing a newly established road; a distribution road selecting section for selecting, as a road represented by the coordinate point string data stored in the distribution road storing section, one of a road in surroundings of the position indicated by the present position data, a road included in the area indicated by the area data and a road in surroundings of the road indicated by the road designating data according to the distribution request information obtained by the distribution request information acquiring section, and for obtaining the coordinate point string data of the road selected; and a road information distribution section for distributing to outside the distribution road information containing the coordinate point string data about the road selected by the distribution road selecting section.

The map information providing system in accordance with the present invention is configured by combining the foregoing map information providing apparatus and the onboard information terminal.

According to the present invention, the map information providing apparatus is configured in such a manner as to distribute the coordinate point string data consisting of a series of plain coordinate points independent of a data format applied to the road information; and the onboard information terminal is configured in such a manner as to generate the road data from the received coordinate point string data in accordance with the data format of the road information the onboard information terminal possesses, and reflects the road data in the map information. Thus, the present invention can provide the onboard information terminal and map information providing apparatus and map information providing system using them capable of updating the map data independently of the data format of the map information.

BRIEF DESCRIPTION OF THE DRAWINGS

FIG. 9 is a flowchart illustrating the operation of the onboard information terminal of an embodiment 4 in accordance with the present invention;

FIG. 10 is a block diagram showing a configuration of the map information providing apparatus of an embodiment 5 in accordance with the present invention;

BEST MODE FOR CARRYING OUT THE INVENTION

The best mode for carrying out the invention will now be described with reference to the accompanying drawings to explain the present invention in more detail. In the following embodiments, the description will be made with designating the same or corresponding components by the same reference symbols.

Embodiment 1

(1-1) Configuration of Map Information Providing System

Figure 1:
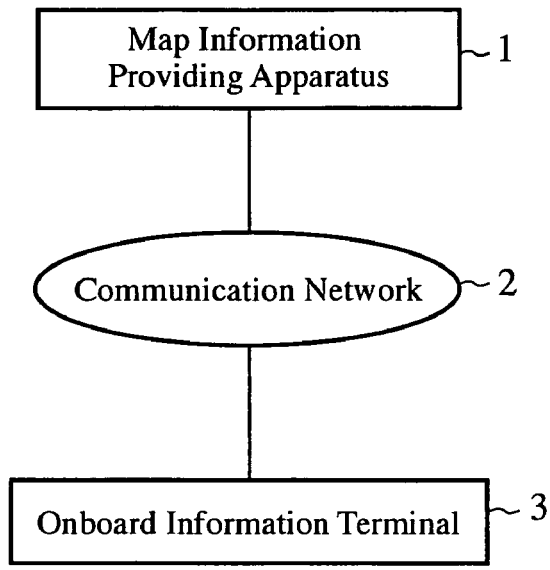
FIG. 1 is a block diagram showing a configuration of a map information providing system of an embodiment 1 in accordance with the present invention.

FIG. 1 is a block diagram showing a configuration of a map information providing system of an embodiment 1 in accordance with the present invention. The map information providing system comprises a map information providing apparatus 1, an onboard information terminal 3 and a communication network 2 connecting them. Although a plurality of onboard information terminal 3 can be connected to the map information providing apparatus 1, it is assumed here that only one onboard information terminal is connected to the single map information providing apparatus 1 for the sake of simplicity of the description.

The map information providing apparatus 1 distributes coordinate point string data, which represents a road by a train of coordinate points indicating geographical positions, to the onboard information terminal 3 via the communication network 2. The details of the map information providing apparatus 1 will be described later. The onboard information terminal 3 is mounted on a vehicle for receiving the coordinate point string data distributed from the map information providing apparatus 1 via the communication network 2, and updates the map information it possesses within itself. The details of the onboard information terminal will be described later. Since the communications between the map information providing apparatus 1 and the onboard information terminal 3 are all carried out via the communication network 2, the description that the communications between them are performed via the communication network 2 will be omitted from now on.

(1-2) Configuration of Map Information Providing Apparatus 1

Figure 2:
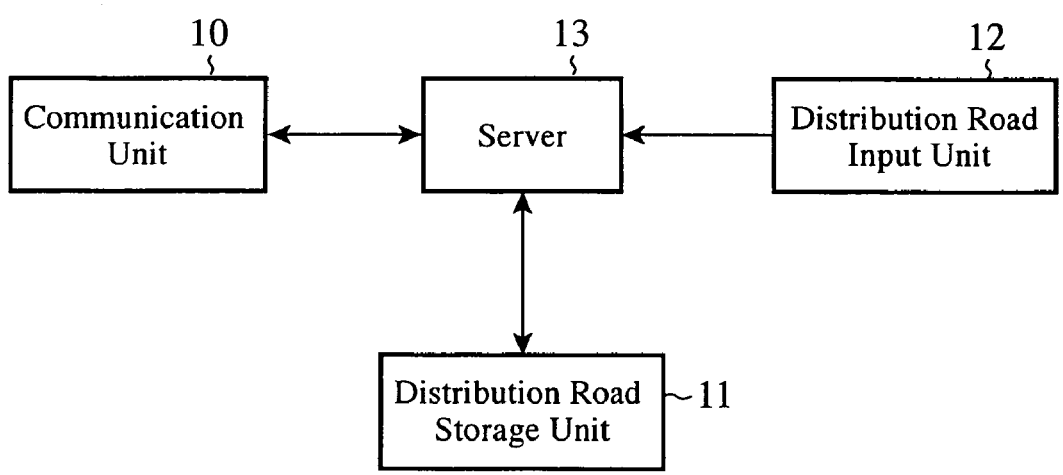
FIG. 2 is a block diagram showing a configuration of a map information providing apparatus of the embodiment 1 in accordance with the present invention.

Next, details of the map information providing apparatus will be described. FIG. 2 is a block diagram showing a configuration of the map information providing apparatus 1. The map information providing apparatus 1 comprises a communication unit 10, a distribution road storage unit 11, a distribution road input unit 12 and a server 13.

The communication unit 10 controls communications between the onboard information terminal 3 and the map information providing apparatus 1 (more specifically the server 13). The distribution road storage unit 11, which corresponds to a distribution road storing section in accordance with the present invention, stores information about roads to be distributed to the onboard information terminal 3. The server 13 carries out writing or reading of the information to or from the distribution road storage unit 11.

The distribution road input unit 12 is used to input information about a road the onboard information terminal 3 is unlikely to possess such as a road newly opened to traffic and about a road whose road attribute changes (the information is referred to as "distribution road source information" from now on). Details of the distribution road source information will be described later. The distribution road source information input from the distribution road input unit 12 is delivered to the server 13.

The server 13 receives the distribution road source information delivered from the distribution road input unit 12, and stores it in the distribution road storage unit 11. In addition, the server 13 receives a distribution request transmitted from the onboard information terminal 3 via the communication unit 10, reads the distribution road source information from the distribution road storage unit 11 in response to the distribution request, generates distribution road information, and transmits the distribution road information generated to the onboard information terminal 3 via the communication unit 10.

(1-3) Configuration of Onboard Information Terminal 3

Figure 3:
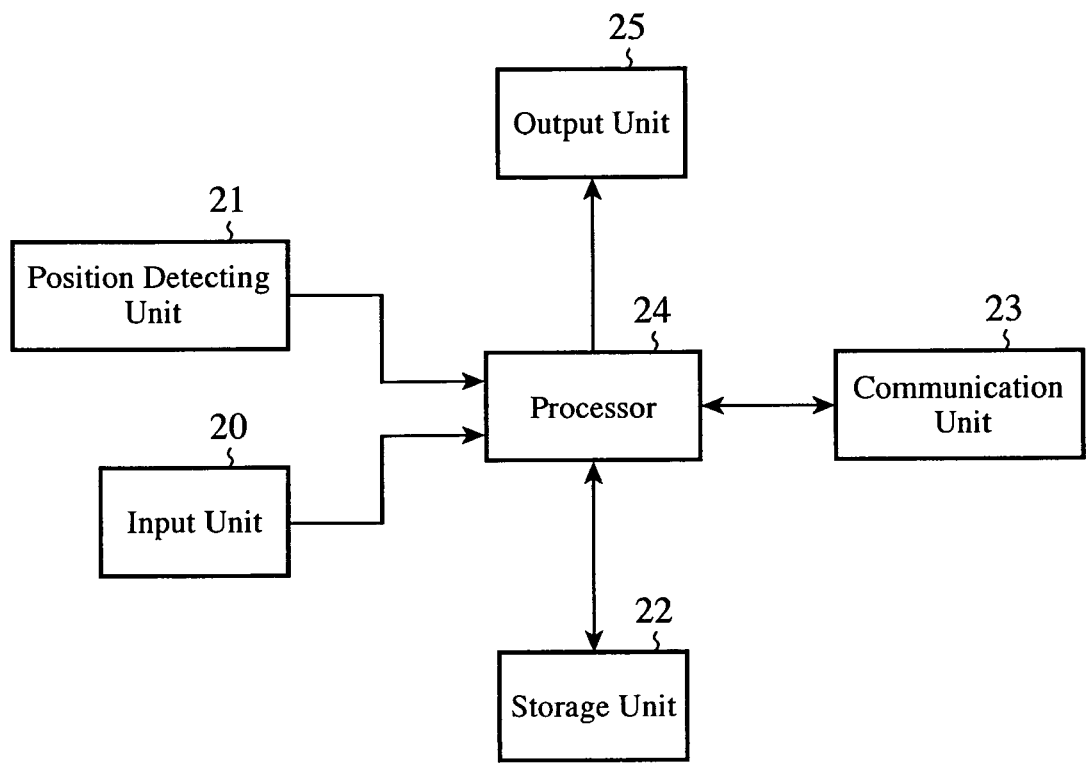
FIG. 3 is a block diagram showing a configuration of an onboard information terminal of the embodiment 1 in accordance with the present invention.

Next, details of the onboard information terminal 3 will be described. FIG. 3 is a block diagram showing a configuration of the onboard information terminal 3. The onboard information terminal 3 comprises an input unit 20, a position detecting unit 21, a storage unit 22, a communication unit 23, a processor 24 and an output unit 25.

The input unit 20 generates an instruction signal in accordance with an operation or instruction of a user, and sends it to the processor 24. More specifically, the input unit 20 can be constructed from at least one of a voice recognition device that recognizes a voice of the user and generates the instruction signal based on the voice, buttons for generating the instruction signal in response to manual operation of the user, and other input units. The position detecting unit 21 detects the present position of the vehicle on which the onboard information terminal 3 is mounted by using a GPS (Global Positioning System) receiver, a vehicle speed sensor and an angular speed sensor, for example. The present position detected by the position detecting unit 21 is delivered to the processor 24 as the position information.

Figure 15:
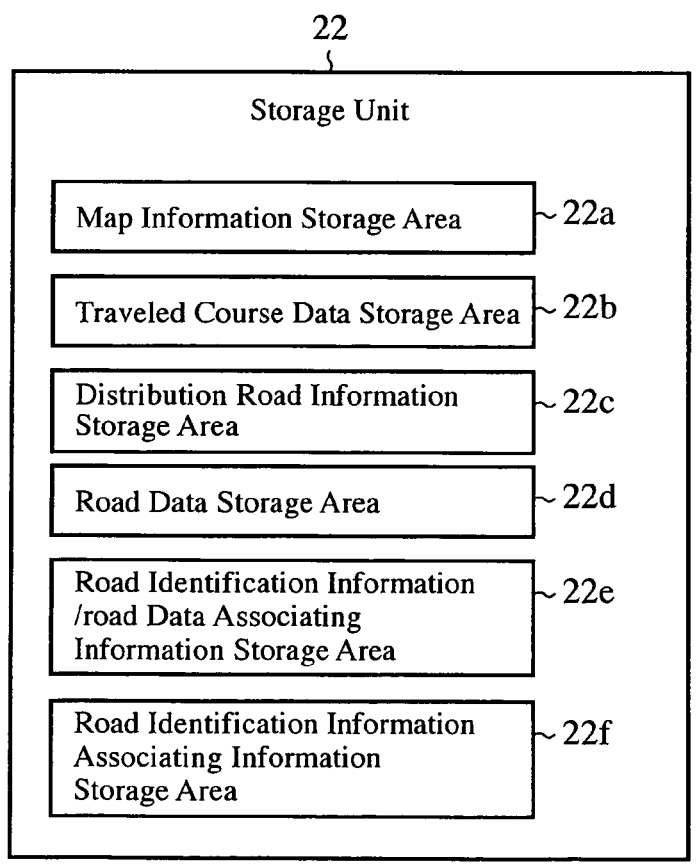
FIG. 15 is a diagram showing storage areas of a storage unit of the onboard information terminal used in each embodiment in accordance with the present invention.

The storage unit 22, which corresponds to the storing section in accordance with the present invention, consists of a hard disk drive using a hard disk as a storage medium, and stores map information. The processor 24 performs writing and reading of the map information to and from the storage unit 22. The storage unit 22 includes, as shown in FIG. 15, a map information storage area 22a, a traveled course data storage area 22b, a distribution road information storage area 22c, a road data storage area 22d, a road identification information/road data associating information storage area 22e and a road identification information associating information storage area 22f, and the map information is stored in the map information storage area 22a. As for the data stored in the other storage areas, they will be described each time they appear below.

The communication unit 23 controls communications between the map information providing apparatus 1 and the onboard information terminal 3 (more specifically, the processor 24). For example, the communication unit 23 receives the distribution road information transmitted from the map information providing apparatus 1, and delivers to the processor 24. Using the distribution road information received from the map information providing apparatus 1 via the communication unit 23, the processor 24 updates the map information stored in the storage unit 22, and executes navigation processing for implementing navigation functions in parallel.

The navigation processing includes the following processings.

(21) Processing of generating traveled course data consisting of a coordinate point string of the positions detected by the position detecting unit 21 along the course of traveling of the vehicle, and of storing the traveled course data in the traveled course data storage area 22b of the storage unit 22.

(22) Map matching processing of estimating the present position by comparing the traveled course data with the map information in the storage unit 22.

(23) Display processing of displaying a map around the present position on a basis of the map information stored in the storage unit 22.

(24) Route search processing of calculating a route from a starting point to a destination using the map information stored in the storage unit 22.

(25) Route display processing of displaying an appropriate candidate of the route obtained by the search together with a map on the screen of a display unit constituting the output unit 25.

(26) Route guidance processing of guiding from the starting point to the destination in accordance with the appropriate route obtained by the route search.

The output unit 25 presents the information obtained in the processing of the processor 24 to the user. The output unit 25 can consist of, for example, a display unit for display the map, present position, route, guidance message and the like, and a voice generating unit for instructing or guiding the user with voice (both the display unit and the voice generating unit are not shown).

Here, the map information will be described. The map information is stored in the storage unit 22 according to the data format specified for the onboard information terminal 3. The data format of the map information can sometimes differ depending on the onboard information terminal 3. The map information stored in the storage unit 22 includes road information, background information, name information, route guidance information and the like. The road information includes data about a road attribute such as names, width, number of lanes, traffic regulations and the like of roads, road configuration, connection between roads, accuracy of the road configuration and the like. The background information includes data for displaying a map background such as rivers and sea. The name information includes data for displaying a name such as a place name. The route guidance information includes data for offering route guidance at intersections and the like.

(1-4) Operation of Map Information Providing Apparatus 1

Figure 4:
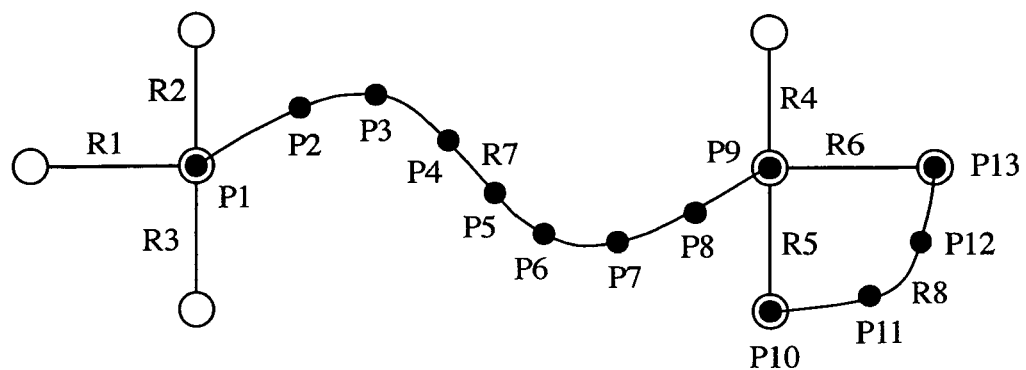
FIG. 4 is a diagram showing an example of a newly established road to be processed by the map information providing system of the embodiment 1 in accordance with the present invention.

Next, the operation of the map information providing apparatus 1 with the foregoing configuration will be described. First, an example of a newly established road will be described with reference to FIG. 4. In FIG. 4, R1-R6 designates existing roads, and a road R7 that connects the intersection of the roads R1, R2 and R3 to the intersection of the roads R4, R5 and R6, and a road R8 that connects an end (P10) of the road R5 with an end (P13) of the road R6 are newly established roads. The points P1-P9 designate vertices of a zigzag line when approximating the center line of the road R7 by the zigzag line. The points P10-P13 designate vertices of a zigzag line when approximating the center line of the road R8 by the zigzag line.

Next, the operation of the map information providing apparatus 1 will be described with reference to the flowchart shown in FIG. 5 with placing the focus on the distribution processing of the distribution road information. Here, the distribution processing of the distribution road information is processing mainly carried out by the server 13.

In the distribution processing of the distribution road information, a check is made whether there is any input of the distribution road source information from the distribution road input unit 12 or not, first, (step ST100). The distribution road source information input from the distribution road input unit 12 includes "road identification information" for identifying the road; "state information" indicating whether the road is a newly established one or a road whose road attribute is changed; "coordinate point string data" representing road configuration; "road attribute information" representing a road attribute; "accuracy information" representing accuracy of the coordinate points of the coordinate point string data; "newly opened time information" representing the newly opened time of the road; and "road attribute changed time information" indicating the time at which the road attribute was changed.

In the road attribute information, the data representing the traffic regulations of the road indicates whether a one-way traffic regulation is the same as or opposite to the direction of the sequence of the coordinate point string; and an entrance or exit regulation to or from the road indicates the direction of the entrance or exit road regulated. Instead of the direction, a coordinate point string can also be used which represents the entrance or exit side road configuration of the entrance or exit road.

As for the coordinate point string data representing the road configuration, that of the road R7 shown in FIG. 4, for example, it is a linear arrangement of coordinate points representing the latitude and longitude of the vertices P1-P9 of the road R7 in the direction from the point P1 to P9. When there is a one-way traffic regulation in the direction from the point P9 to P1, it is represented as the direction opposite to the order of arrangement of the coordinate point string. When there is an entrance regulation from the road R2 to the road R7, the direction of the road R2 is indicated as the entrance regulation to the road R7 at the P1 side. In FIG. 4, when the roads R7 and R8 are newly established, the distribution road source information about the roads R7 and R8 is input from the distribution road input unit 12.

At step ST100, if a decision is made that there is an input of the distribution road source information, the distribution road source information input is stored in the distribution road storage unit 11 (step ST110). More specifically, the server 13 stores the distribution road source information sent from the distribution road input unit 12 into the distribution road storage unit 11. For example, when the roads R7 and R8 are newly established as shown in FIG. 4, the distribution road source information about the roads R7 and R8 are stored in the distribution road storage unit 11. If a decision is made at the foregoing step ST100 that there is no input of the distribution road source information, the processing at step ST110 is skipped.

Subsequently, a check is made whether there is distribution request information or not (step ST120). More specifically, the server 13 checks whether the communication unit 10 receives the distribution request information from the onboard information terminal 3 or not. At step ST120, unless a decision is made that there is distribution request information, the sequence returns to step ST100 to repeat the foregoing processing and to store the distribution road information in the distribution road storage unit 11.

In contrast, if a decision is made at step ST120 that there is distribution request information, the onboard information terminal identification information for identifying the onboard information terminal 3 is acquired next (step ST130). More specifically, the server 13 obtains the onboard information terminal identification information contained in the distribution request information acquired from the communication unit 10. The distribution request information acquiring section in accordance with the present invention is implemented by the processing at this step ST130.

Subsequently, the distribution road information is generated (step ST140). More specifically, the server 13 retrieves the coordinate point string data, road attribute information and accuracy information from the distribution road source information stored in the distribution road storage unit 11; and generates the distribution road information by adding a header to the coordinate point string data, road attribute information and accuracy information retrieved. The header is data for managing the distribution road information. For example, the coordinate point string data in the distribution road information about the newly established road R7 in FIG. 4 consists of a series of the coordinate points representing the latitude and longitude of the vertices P1-P9 of the road R7.

Subsequently, the distribution road information is distributed (step ST150). More specifically, the server 13 transmits the distribution road information generated at step ST140 to the onboard information terminal 3 corresponding to the onboard information terminal identification information obtained at step ST130 via the communication unit 10. After that, the sequence returns to step ST100 to repeat the foregoing processing. The road information distribution section in accordance with the present invention is implemented by the processing at the foregoing step ST140 and step ST150.

Through the foregoing distribution processing that distributes the distribution road information, the onboard information terminal 3 is provided with the distribution road information including, as to the newly established roads R7 and R8 as shown in FIG. 4, for example, the coordinate point string data consisting of the series of the coordinate points representing the latitude and longitude of the vertices P1-P9 of the road R7, and the coordinate point string data consisting of a series of the coordinate points representing the latitude and longitude of the vertices P10-P13 of the road R8.

(1-5) Operation of Onboard Information Terminal 3

Figure 6:
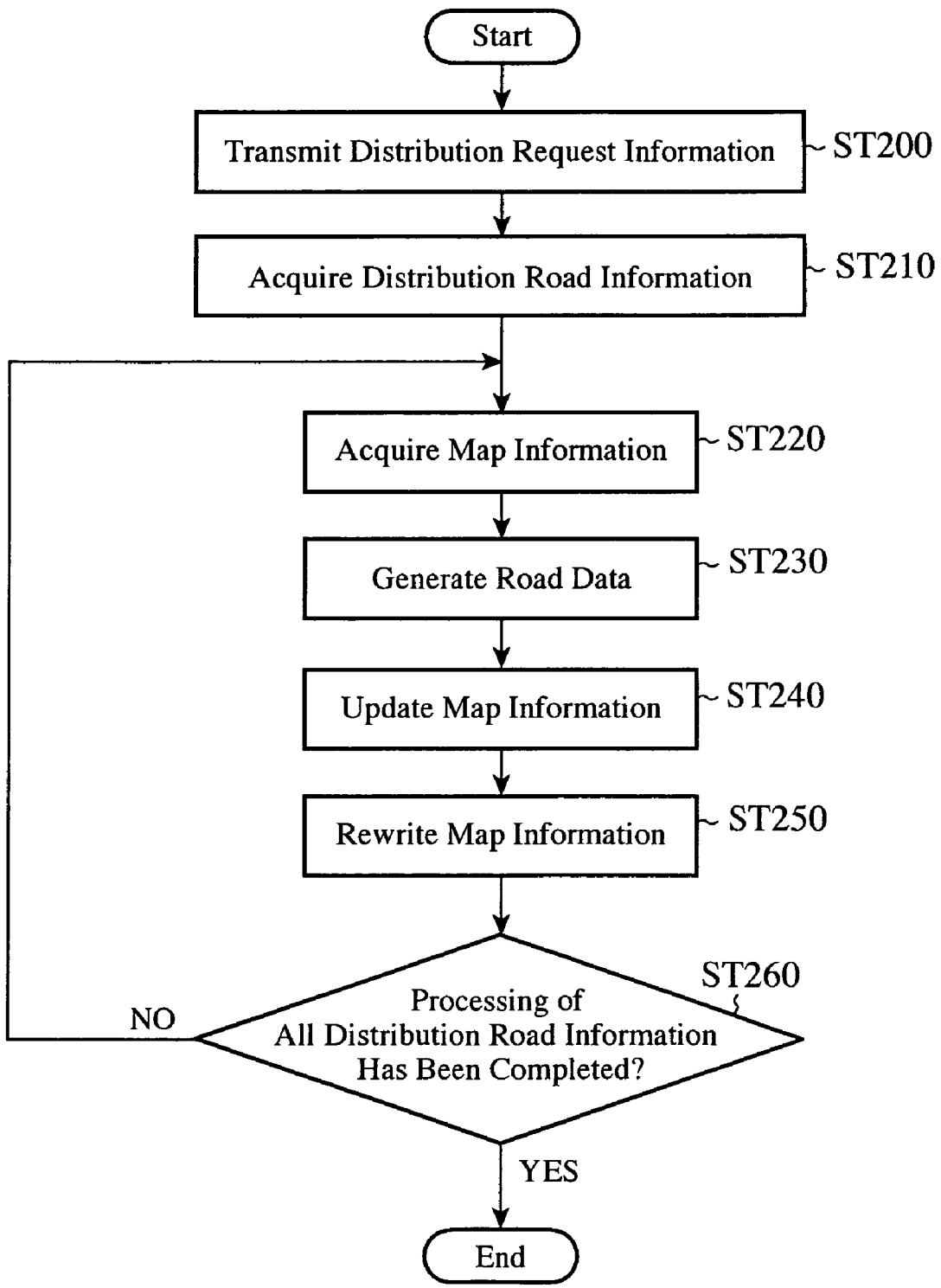
FIG. 6 is a flowchart illustrating the operation of the onboard information terminal of the embodiment 1 in accordance with the present invention.

Next, the operation of the onboard information terminal 3 with the foregoing configuration will be described with reference to the flowchart shown in FIG. 6 with placing the focus on the update processing of the map information. The processor 24 executes the update processing of the map information. The update processing of the map information is started when the user of the onboard information terminal 3 inputs an instruction to obtain the distribution road information from the input unit 20.

In the update processing of the map information, the distribution request information is transmitted, first (step ST200). More specifically, the processor 24 delivers to the communication unit 23 the distribution request information including a distribution request information header which is a header for managing the distribution request information and the onboard information terminal identification information assigned to the onboard information terminal. Thus, the distribution request information is transmitted to the map information providing apparatus 1. Subsequently, the distribution road information is obtained (step ST210). More specifically, in response to the transmission of the distribution request information at step ST200, the processor 24 receives the distribution road information transmitted from the map information providing apparatus 1 via the communication unit 23; obtains the distribution road information including the coordinate point string data, road attribute information and accuracy information contained in the received distribution road information; and stores it in its internal memory (not shown). Thus, the processing step ST210 obtains the distribution road information including, as to the newly established roads R7 and R8 as shown in FIG. 4, for example, the coordinate point string data consisting of the series of the coordinate points representing the latitude and longitude of the vertices P1-P9 of the road R7, and the coordinate point string data consisting of the series of the coordinate points representing the latitude and longitude of the vertices P10-P13 of the road R8. The distribution information acquiring section in accordance with the present invention is implemented by the processing at step ST210.

Subsequently, the map information is acquired (step ST220). More specifically, the processor 24 retrieves from the storage unit 22 the map information about a region having the coordinate points of the coordinate point string data contained in the distribution road information acquired at step ST210, and stores it in the internal memory (not shown). Subsequently, the road data is generated (step ST230). More specifically, according to the coordinate point string data, road attribute information and accuracy information contained in the distribution road information acquired at step ST210, the processor 24 generates the road data for adding the road represented by the coordinate point string data to the road network represented by the road information contained in the map information obtained at step ST220. The road data generated at step ST230 includes data representing relationships between the road represented by the coordinate point string data and a road registered in the road information, which is obtained from positional relationships between the coordinate values of an endpoint of the road represented by the coordinate point string data and the road registered in the road information; data representing the road configuration obtained from the coordinate point string data; data representing the road attribute set in accordance with the road attribute information; and data representing the accuracy of the data representing the configuration set in accordance with the accuracy information. As for the foregoing data, each of them is generated in a format which is the same at least in part as the data format defined for the onboard information terminal, which is employed for storing the road information in the storage unit 22.

For example, as to the road R7 shown in FIG. 4, according to the fact that the coordinate point of the vertex P1 of the endpoint of the road R7 agrees with the intersection of the roads R1, R2 and R3 within tolerance limits, and the coordinate point of the vertex P9 of the endpoint of the road R7 agrees with the intersection of the roads R4, R5 and R6 within tolerance limits, a decision is made that the road R7 is connected to the roads R1, R2 and R3 and the roads R4, R5 and R6, and the data is generated which represents that the road R7 has its vertex P1 side connected to the roads R1, R2 and R3 and its vertex P9 side to the roads R4, R5 and R6. In addition, as the data representing the road configuration, a series of data is generated which represents the latitude and longitude of the vertices P1-P9 of the road R7. A road data generating section in accordance with the present invention is implemented by the processing at step ST230.

Subsequently, the map information is updated (step ST240). More specifically, the processor 24 inserts or adds the road data it generates at step ST230 into or to the road information contained in the map information obtained step ST220; and alters the road information in order to connect the road registered in the road information to the road represented by the road data. The processing at step ST240 enables the internal memory of the processor 24 to obtain the map information updated. For example, as to the roads R7 and R8 shown in FIG. 4, the road data about the road R7 and the road data about the road R8 are added to or inserted into the road information so that the road information is altered in such a manner that the roads R1-R6 are connected to the road R7 and the roads R5 and R6 are connected to the road R8. The map information update section in accordance with the present invention is implemented by the processing at step ST240.

Subsequently, the map information is rewritten (step ST250). More specifically, the processor 24 rewrites the map information stored in the storage unit 22 to the updated map information that is stored in the internal memory at step ST240. Subsequently, a check is made whether the processing of all the distribution road information has been completed or not (step ST260). More specifically, as to all the distribution road information acquired at step ST210, a check is made whether the processing from step ST220 to step ST250 has been completed. At step ST260, unless a decision is made that the processing of all the distribution road information has been completed, the sequence returns to step ST220 to repeat the foregoing processing. In contrast, if a decision is made at step ST260 that the processing of all the distribution road information has been completed, the update processing of the map information is brought to an end.

According to the foregoing processing, when the roads R7 and R8 shown in FIG. 4 are newly established, for example, the map information stored in the storage unit 22 is updated to the map information in which the roads R7 and R8 are added to the road R1-R6.

As described above, the map information providing system of the embodiment 1 in accordance with the present invention is configured in such a manner that the map information providing apparatus 1 provides the onboard information terminal 3 with the coordinate point string data consisting of the plain series of the coordinate points, which is independent of the data format applied to the road information of the onboard information terminal 3; and that the onboard information terminal 3 generates the road data in accordance with the data format of the road information it possesses. Thus, regardless of the difference of the data format applied to the road information, any onboard information terminal 3 can easily update the map information. In addition, since the distribution road information includes the accuracy information representing the accuracy of the coordinate point string data, the accuracy of the configuration of the additional road can be obtained from the map information after the update. As a result, as for the additional road, the map matching and traveling considering the error of the road configuration can be performed. Thus, the present embodiment can improve the performance of the onboard information terminal.

Embodiment 2

The embodiment 2 in accordance with the present invention is configured in such a manner that the onboard information terminal 3 constituting the map information providing system updates the map information on the basis of the distribution road information obtained in the past. The configurations of the map information providing system, map information providing apparatus 1 and onboard information terminal 3 of the embodiment 2 in accordance with the present invention are the same as the configurations of those of the foregoing embodiment 1. However, to store the distribution road information, the distribution road information storage area 22c of the storage unit 22 as shown in FIG. 15 is newly used. The distribution road information storage area 22c corresponds to the distribution road information storing section in accordance with the present invention.

Figure 7:
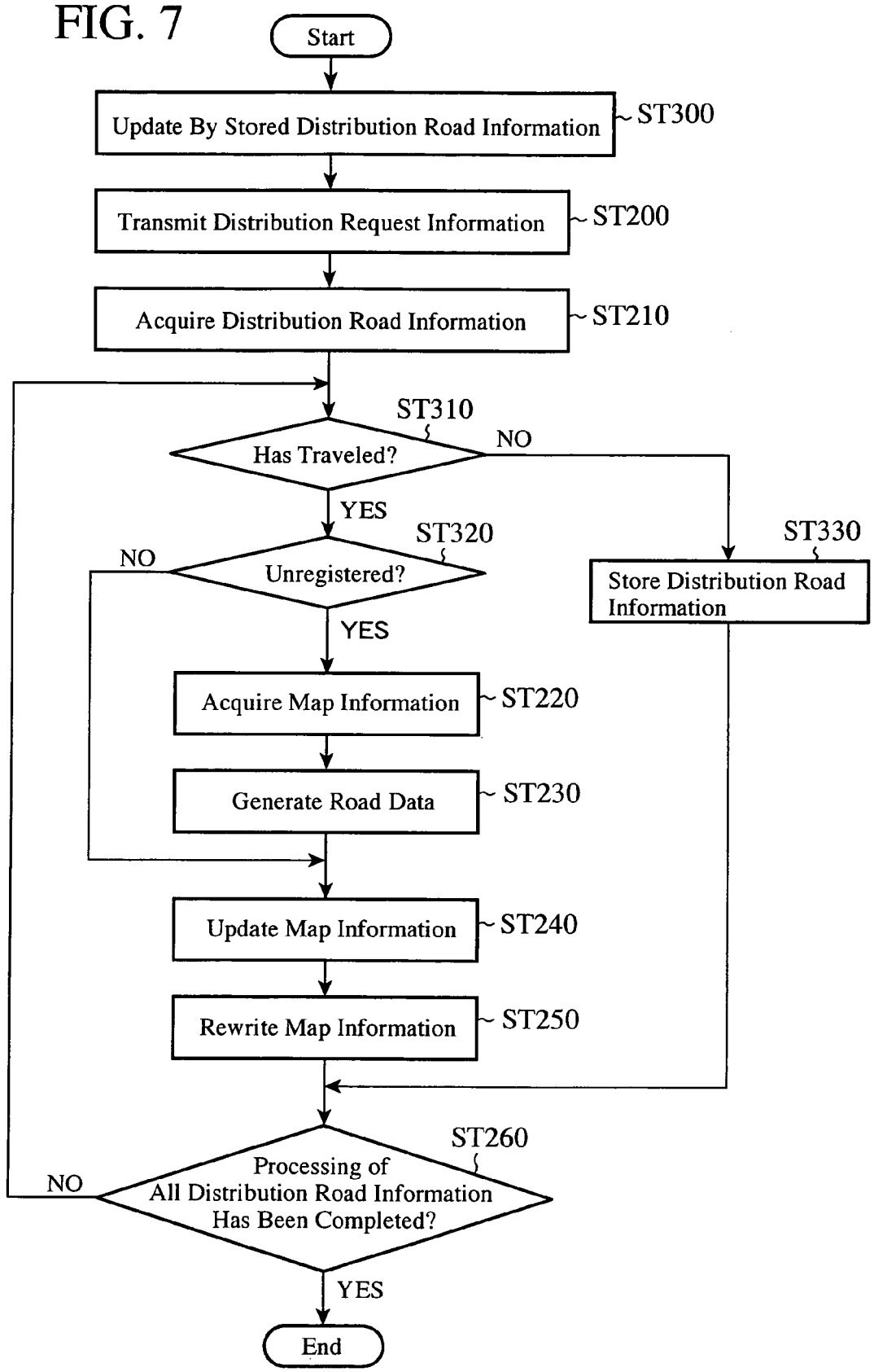
FIG. 7 is a flowchart illustrating the operation of the onboard information terminal of an embodiment 2 in accordance with the present invention.

The operation of the map information providing apparatus 1 of the embodiment 2 in accordance with the present invention is the same as that of the map information providing apparatus 1 of the foregoing embodiment 1. Thus, only the operation of the onboard information terminal 3 will be described below with reference to the flowchart illustrated in FIG. 7. The flowchart illustrated in FIG. 7 consists of the flowchart illustrated in FIG. 6 plus step ST300, step ST310, step ST320 and step ST330. The following description will be made with placing the focus on the additional portion by designating the steps carrying out the same processing as those of the flowchart illustrated in FIG. 6 by the same, reference symbols as those used in FIG. 6 to simplify the description.

In the update processing of the map information, update using the stored distribution road information is carried out, first (step ST300). More specifically, if the distribution road information is stored in the distribution road information storage area 22*c* of the storage unit 22, the processor 24 makes, for the individual items of the distribution road information stored, the same decision as that of step ST310 which will be described later. If it makes a decision that the vehicle has traveled the road represented by the distribution road information, the processor 24 carries out the same processing as that of step ST220, step ST230, step ST240 and step ST250 of the embodiment 1 on the basis of the distribution road information, thereby updating and rewriting the map information stored in the map information storage area 22*a* of the storage unit 22.

Subsequently, the distribution request information is transmitted (step ST200), and the distribution road information is acquired (step ST210). Subsequently, a check is made whether the vehicle has traveled the road represented by the distribution road information obtained at step ST210 (step ST310). More specifically, the processor 24 compares the coordinate point string data of the distribution road information acquired at step ST210 with the traveled course data stored in the traveled course data storage area 22*b* of the storage unit 22. As a result of the comparison, if the coordinate point string data of the distribution road information is included within the traveled course indicated by the traveled course data within tolerance limits defined by the accuracy information of the distribution road information, a decision is made that the vehicle has traveled the road represented by the distribution road information, otherwise, it has not traveled the road. The traveling deciding section in accordance with the present invention is implemented by the processing at step ST310.

At step ST310, if a decision is made that the vehicle has traveled the road represented by the distribution road information, a check is made subsequently whether the road represented by the distribution road information is unregistered or not (step ST320). More specifically, the processor 24 compares the coordinate point string data of the distribution road information acquired at step ST210 with the data representing the configuration of the road registered in the road information in the map information stored in the map information storage area 22*a* in the storage unit 22, and searches for the road which is registered in the road information and has the configuration that agrees with the configuration of the road represented by the distribution road information within tolerance limits. If the road is searched, a decision is made that the road has already been registered, otherwise a decision is made that the road is not yet registered. A registration deciding section in accordance with the present invention is implemented by the processing at step ST320.

At step ST320, if a decision is made that the road is unregistered, the map information is obtained (step ST220) to generate the road data (step ST230). In contrast, unless a decision is made at step ST320 that the road is unregistered, that is, the road has already been registered, the processing at step ST220 and ST230 is skipped. Subsequently, the map information is updated (step ST240), and the map information is rewritten (step ST250). Subsequently, a check is made whether the processing of all the distribution road information has been completed or not (step ST260). Unless a decision is made that the processing of all the distribution road information has been completed, the sequence returns to step ST220 to repeat the foregoing processing. In contrast, if a decision is made at step ST260 that the processing of all the distribution road information has been complete, the update processing of the map information is brought to an end.

At the foregoing step ST310, unless a decision is made that the vehicle has traveled the road represented by the distribution road information, the distribution road information is stored (step ST330). More specifically, the processor 24 stores the distribution road information acquired at step ST210 into the distribution road information storage area 22*c* of the storage unit 22. After that, the sequence proceeds to step ST260.

As described above, the embodiment 2 in accordance with the present invention is configured in such a manner as to store the distribution road information in the storage unit 22. Thus, it can make effective use of the distribution road information obtained in the past. In addition, it is likely that the road the user has traveled will be used again in the future, and the map information is updated on the basis of the distribution road information of the road. Thus, the road with a high usage rate can be added to the map information. Furthermore, since a decision is made as to whether the vehicle has traveled the road or not considering the accuracy information contained in the distribution road information, the decision as to whether the vehicle has traveled the road represented by the distribution road information or not can be made accurately.

In addition, when the road represented by the distribution road information has been registered, the road data corresponding to the distribution road information is not generated. This makes it possible to prevent the road data about the road that has already been registered from being generated. Furthermore, since the present embodiment is configured in such a manner as not to store the distribution road information from which the road data is generated, it can prevent a wasteful use of the storage area of the storage unit 22. In addition, since only the road data necessary can be generated from the distribution road information distributed, the processing load can be reduced. Furthermore, among the distribution road information distributed, the road data whose necessity is great can be generated, and as for the remaining data, they can also be utilized when their necessity increases.

Embodiment 3

The configurations of the map information providing system, map information providing apparatus 1 and onboard information terminal 3 of the embodiment 3 in accordance with the present invention are the same as those of their counterparts of the foregoing embodiment 1. However, to store the distribution road information, the distribution road information storage area 22*c* of the storage unit 22 as shown in FIG. 15 is newly used; and to store the road data, the road data storage area 22*d* of FIG. 15 is newly used. The distribution road information storage area 22*c* corresponds to the distribution road information storing section in accordance with the present invention; and the road data storage area 22*d* corresponds to the road data storing section in accordance with the present invention.

The operation of the map information providing apparatus 1 of the embodiment 3 in accordance with the present invention is the same as that of the map information providing apparatus 1 of the foregoing embodiment 1. Thus, only the operation of the onboard information terminal 3 will be described below with reference to the flowchart illustrated in FIG. 8. The flowchart illustrated in FIG. 8 consists of the flowchart illustrated in FIG. 6 plus step ST400, step ST410 and step ST420. The following description will be made with placing the focus on the additional portion by designating the steps carrying out the same processing as those of the flowchart illustrated in FIG. 6 by the same reference symbols as those used in FIG. 6 to simplify the description.

In the update processing of the map information, the distribution request information is transmitted (step ST200), and the distribution road information is obtained, first (step ST210). Subsequently, the distribution road information about the unregistered road is stored (step ST400). More specifically, the processor 24 performs the following processing on all the distribution road information acquired at step ST210. First, the processor 24 compares the coordinate point string data of the distribution road information with the data representing the configuration of the road represented by the road information stored in the road data storage area 22d of the storage unit 22, and searches for the road data having the configuration that agrees with the configuration of the road represented by the distribution road information within tolerance limits. If the road is searched, a decision is made that the road has already been registered. In contrast, unless the road is searched, the processor 24 further compares the coordinate point string data of the distribution road information with the data representing the configuration of the road registered in the road information in the map information stored in the map information storage area 22a of the storage unit 22, and searches for the road which is registered in the road information and has the configuration that agrees with the configuration of the road represented by the distribution road information within tolerance limits. If the road is searched for, a decision is made that the road has already been registered, otherwise a decision is made that the road is not yet registered. As a result of making the unregistered decision, the processor 24 stores the distribution road information into the distribution road information storage area 22b of the storage unit 22. The decision processing at step ST400 corresponds to the registration deciding section in accordance with the present invention.

Subsequently, a check is made whether the vehicle has traveled the road represented by the distribution road information obtained at step ST210 (step ST410). At this step ST410, for the distribution road information stored in the distribution road information storage area 22c of the storage unit 22, the same processing at step ST310 of the flowchart illustrated in FIG. 7 of the embodiment 2 is performed. At step ST410, if a decision is made that the vehicle has traveled the road represented by the distribution road information, the map information is acquired subsequently (step ST220). More specifically, as to the distribution road information stored in the distribution road information storage area 22c of the storage unit 22, the same processing as that of step ST220 of the flowchart illustrated in FIG. 6 of the embodiment 1 is executed. Subsequently, the road data is generated (step ST230). More specifically, on the basis of the distribution road information stored in the distribution road information storage area 22c of the storage unit 22, the road data is generated in the same manner as in step ST230 of a flowchart illustrated in FIG. 6 of the embodiment 1.

Subsequently, the distribution road information is deleted (step ST420). More specifically, the processor 24 deletes the distribution road information corresponding to the road data generated at step ST230 from the distribution road information storage area 22c of the storage unit 22. At the foregoing step ST410, unless a decision is made that the vehicle has traveled the road represented by the distribution road information, the processing at step ST220, step ST230 and step ST420 is skipped.

Subsequently, the map information is updated (step ST240), and the map information is rewritten (step ST250). Then, a check is made whether the processing of all the distribution road information has been completed or not (step ST260). Unless a decision is made that the processing of all the distribution road information has been completed at step ST260, the sequence returns to step ST410 to repeat the foregoing processing. In contrast, if a decision is made at step ST260 that the processing of all the distribution road information has been complete, the update processing of the map information is brought to an end.

As described above, according to the embodiment 3 in accordance with the present invention, since the road data is stored in the storage unit 22, it is sufficient to generate the road data relating to the same road only once. In addition, since the distribution road information is stored in the storage unit 22, effective use of the distribution road information obtained in the past can be made. Furthermore, since the present embodiment does not store the distribution road information on which the unregistered decision is made, it can prevent a wasteful use of the storage area of the storage unit 22.

In addition, it is likely that the road the user has traveled once will be used again in the future, and the map information is updated on the basis of the distribution road information of the road. Thus, the road with a high usage rate can be added to the map information. Furthermore, since the present embodiment deletes the distribution road information corresponding to the generated road data from the storage unit 22, it can prevent the wasteful use of the storage area of the storage unit 22.

Embodiment 4

The embodiment 4 in accordance with the present invention is configured in such a manner that a user of the onboard information terminal can add a desired road. The configurations of the map information providing system, map information providing apparatus 1 and onboard information terminal 3 of the embodiment 4 in accordance with the present invention are the same as those of their counterparts of the foregoing embodiment 1.

The operation of the map information providing apparatus 1 of the embodiment 4 in accordance with the present invention is the same as that of the map information providing apparatus 1 of the foregoing embodiment 1. Thus, only the operation of the onboard information terminal 3 will be described below with reference to the flowchart illustrated in FIG. 9. The processing illustrated in FIG. 9 is started when the user of the onboard information terminal 3 inputs an instruction to display a list of the distribution road information stored in the storage unit 22 from the input unit 20.

First, the distribution road information is acquired (step ST500). More specifically, the processor 24 obtains the distribution road information transmitted from the map information providing apparatus 1 or the distribution road information stored in the storage unit 22. Subsequently, the map information is acquired (step ST510). More specifically, the processor 24 retrieves from the storage unit 22 the map information containing the position indicated by the coordinate point string data of the distribution road information acquired at step ST500. Subsequently, the map information is displayed (step ST520). More specifically, the processor 24 has the output unit 25 display roads, background and names using the map information acquired at step ST510.

Figure 16:
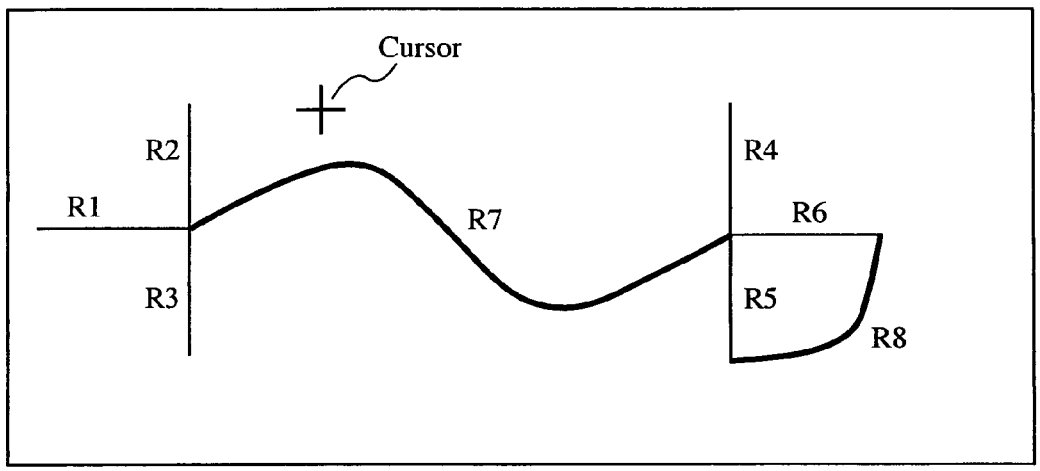
FIG. 16 is a diagram for explaining the operation of the onboard information terminal of the embodiment 4 in accordance with the present invention.

Subsequently, the distribution road information is displayed (step ST530). More specifically, using the coordinate point string data of the distribution road information acquired at step ST500, the processor 24 has the output unit 25 display on the screen it displays at step ST520 the road represented by the distribution road information with placing emphasis on the road. A road presentation section in accordance with the present invention is implemented by the processing at this step ST530. FIG. 16 shows an example of the screen of the output unit 25 at the time when the distribution road information about the newly established roads R7 and R8 as shown in FIG. 4 is stored in the storage unit 22. The roads R7 and R8 are displayed with bold lines to place emphasis on them.

Subsequently, a road is selected (step ST540). More specifically, the user of the onboard information terminal 3 selects a road from the roads displayed on the screen of the output unit 25 at step ST530 via the input unit 20. For example, the user moves a cursor on the screen shown in FIG. 16 using the input unit 20, and selects a desired road by hitting the road R7 or R8. A road selecting section in accordance with the present invention is implemented by the processing at step ST540.

Subsequently, the road data is generated (step ST550). The processing at this step ST550 is the same as the processing at step ST230 of the embodiment 1: the road data is generated on the basis of the distribution road information about the road selected at step ST540. Subsequently, the distribution road information is deleted (step ST560). More specifically, the processor 24 deletes the distribution road information corresponding to the road data generated at step ST550 from the storage unit 22.

Subsequently, the map information is updated (step ST570). The processing at step ST570 is the same as the processing at step ST240 in the embodiment 1: the map information obtained at step ST510 is updated by using the road data generated at step ST550. Subsequently, the map information is rewritten (step ST580). More specifically, the processor 24 rewrites the map information in the storage unit 22 to the map information obtained at step ST570.

As described above, according to the embodiment 4 in accordance with the present invention, since the user can select the distribution road information stored in the storage unit 22, the user can add a desired road to the map information.

Embodiment 5

The embodiment 5 in accordance with the present invention is a variation of the embodiment 3 modified in the following manner.

(2-1) Map Information Providing Apparatus 1

FIG. 10 is a block diagram showing a configuration of the map information providing apparatus 1 of the embodiment 5. The map information providing apparatus 1 has a configuration that adds a map information storage unit 14 to the map information providing apparatus 1 of the embodiment 3. The map information storage unit 14 stores the latest map information in a data format uniquely defined for the map information providing apparatus 1.

Next, the operation of the map information providing apparatus 1 of the embodiment 5 will be described with reference to the flowchart illustrated in FIG. 11. The flowchart illustrated in FIG. 11 consists of the flowchart illustrated in FIG. 5 plus step ST600 for selecting the road to be distributed. In the following description, steps carrying out the same processing as the steps of the flowchart illustrated in FIG. 5 are designated by the same reference symbols used in FIG. 5, and their description will be omitted. Thus, only different portions will be described below.

Figure 11:
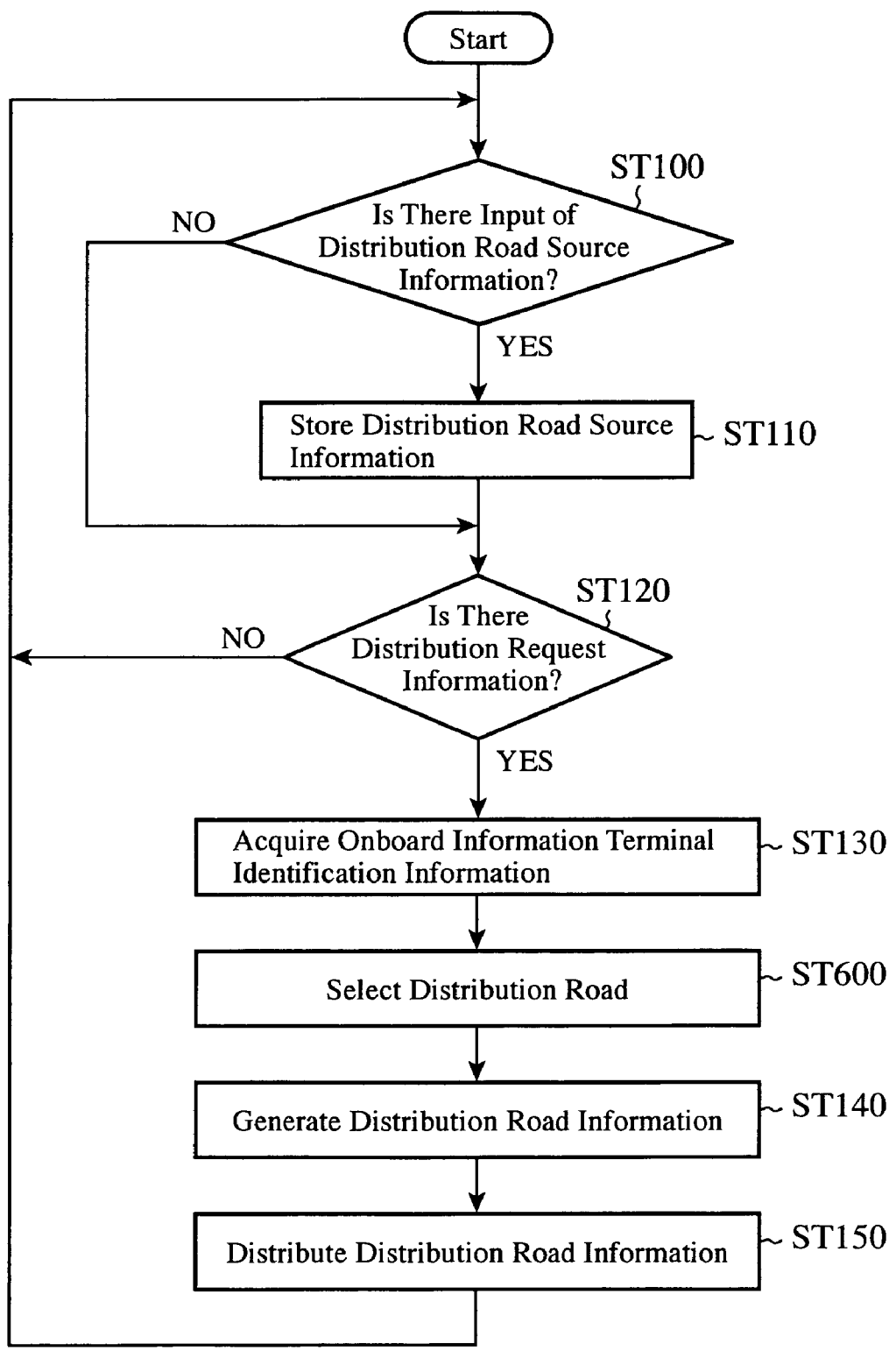
FIG. 11 is a flowchart illustrating the operation of the map information providing apparatus of the embodiment 5 in accordance with the present invention.

At step ST140 of the flowchart illustrated in FIG. 11, the road identification information, coordinate point string data, road attribute information and accuracy information are retrieved from the distribution road source information about the road selected at step ST600, which is stored in the distribution road storage unit 11; and the distribution road information is generated which consists of the retrieved road identification information, coordinate point string data, road attribute information and accuracy information. However, if the state information of the distribution road source information indicates that the road attribute alters, the distribution road information is generated which consists of the road identification information and road attribute information. The map information storage unit 14 corresponds to the providing side map information storing section in accordance with the present invention.

The following processing is executed at step ST600. According to the contents of the distribution request information received by the communication unit 10, the relevant distribution road source information is selected from the distribution road storage unit 11, and its road identification information is obtained.

(31) When the distribution request information contains the present position data indicating the position of the vehicle, the road identification information of the distribution road source information is obtained which has the coordinate point string data contained within the prescribed limits of the position indicated by the present position data by searching the distribution road source information stored in the distribution road storage unit 11.

(32) When the distribution request information contains the area data indicating an area including a desired road, the road identification information of the distribution road source information is obtained which has the coordinate point string data contained in the area such as a circular region and polygonal region indicated by the area data indicating the circular region, polygonal region and the like by searching the distribution road source information stored in the distribution road storage unit 11.

(33) When the distribution request information has the coordinate point string data as the road designating data indicating the road to be designated for indicating a desired area, the road identification information of the distribution road source information is obtained which has the coordinate point string data included within the prescribed limits of the traveled course indicating the coordinate point string data representing the road to be designated for indicating the desired area by searching the distribution road source information stored in the distribution road storage unit 11.

(34) When the distribution request information has the road identification information as the road designating data indicating the road to be designated for indicating a desired area, the coordinate point string data in the distribution road source information is obtained, which is associated with the road identification information indicating the road to be designated for indicating the desired area, by searching the distribution road source information stored in the distribution road storage unit 11; and subsequently, from the distribution road source information stored in the distribution road storage unit 11, the road identification information of the distribution road source information is obtained which has the coordinate point string data included within the prescribed limits of the coordinate point string represented by the coordinate point string data.

(35) When the distribution request information contains the present position data indicating the present position of the vehicle and the destination data indicating the destination, an appropriate route from the position indicated by the present position data to the position indicated by the destination data is obtained using the map information stored in the map information storage unit 14. Subsequently, the road identification information of the distribution road source information is obtained which has the coordinate point string data included within the prescribed limits of the appropriate route by searching the distribution road source information stored in the distribution road storage unit 11. The processing of obtaining the appropriate route corresponds to the route search section in accordance with the present invention.

In the foregoing (31)-(35), when the distribution request information contains period data representing a period of time required, the search of the distribution road source information stored in the distribution road storage unit 11 is carried out only for the distribution road source information in which the newly opened time information and road attribute changed time information are contained in the period represented by the period data. In addition, in the foregoing (31)-(35), when the distribution request information contains the road identification information indicating the road stored in the storage unit 22 of the onboard information terminal 3 as unnecessary road designating data indicating an undesired road, the search of the distribution road source information stored in the distribution road storage unit 11 is carried out with excluding the distribution road source information having the road identification information. The processing at step ST600 that implements this function corresponds to the distribution road selecting section in accordance with the present invention.

(2-2) Onboard Information Terminal 3

Next, the onboard information terminal 3 will be described. The configuration of the onboard information terminal 3 of the embodiment 5 is the same as that of the onboard information terminal 3 of the foregoing embodiment 3. However, to store the road identification information/road data associating information, the road identification information/road data associating information storage area 22e of the storage unit 22 shown in FIG. 15 is newly used; and to store the road identification information associating information, the road identification information associating information storage area 22f of the storage unit 22 shown in FIG. 15 is newly used. The road identification information/road data associating information storage area 22e corresponds to the road identification information/road data associating information storing section in accordance with the present invention, and the road identification information associating information storage area 22f corresponds to the road identification information associating information storing section in accordance with the present invention.

Incidentally, the road identification information/road data associating information is the information for establishing correspondence between the road identification information and the road data; and the road identification information associating information is the information for establishing correspondence between the road identification information and the road data added to the road information in the map information stored in the storage unit 22.

The operation of the onboard information terminal 3 is performed by altering step ST200, step ST210, step ST400, step ST230 and step ST240 in the flowchart illustrated in FIG. 8 as follows. First, at step ST200, according to the instruction of the user input from the input unit 20, the following distribution request information is generated and transmitted to the map information providing apparatus 1 via the communication unit 23. The processing at step ST200 corresponds to the distribution information request section in accordance with the present invention.

(41) When the user instructs to acquire a road in the surroundings of the present position, the distribution request information is generated which consists of the distribution request information header, the onboard information terminal identification information, and the present position data indicating the present position obtained by the navigation processing.

(42) When the user inputs an area in which the road information is to be acquired, the distribution request information is generated which consists of the distribution request information header, the onboard information terminal identification information, and the area data indicating the area.

(43) When the user instructs to acquire a road in the surroundings of the road the user has traveled, the traveled course data stored in the storage unit 22 is compared with the data representing the road configuration registered in the map information stored in the storage unit 22; and unless there is a road included in the traveled course represented by the traveled course data, the distribution request information is generated which consists of the distribution request information header, onboard information terminal identification information, and the coordinate point string data of the traveled course data.

(44) When there is a road included in the traveled course, the road identification information associating information stored in the storage unit 22 is checked; and if there is any corresponding road identification information, the road identification information is obtained, and the traveled course is divided to portions excluding the road portion having the road identification information corresponding to the traveled course, and their coordinate point string data are obtained; and the distribution request information is generated which consists of the distribution request information header, the onboard information terminal identification information, the road identification information obtained above, and the coordinate point string data obtained above. The coordinate point string data and the road identification information contained in the distribution request information correspond to the road designating data, which indicates the road for designating the desired area, that is, the road the vehicle has traveled and its surroundings.

(45) When the user instructs to acquire a road in the surroundings of the route obtained by the route search of the navigation processing, the road identification information associating information stored in the storage unit 22 is checked; if there is any road identification information corresponding to the road constituting the route, the road identification information is acquired; and if not, from the road information in the map information in the storage unit 22, the coordinate point string data representing the road configuration is obtained, and the distribution request information is generated which consists of the distribution request information header, the onboard information terminal identification information, the road identification information obtained above, and the coordinate point string data obtained above.

The coordinate point string data and the road identification information contained in the distribution request information correspond to the road designating data, which indicates the road for designating the desired area, that is, the surroundings of the route obtained by the route search.

(46) When the user instructs to acquire a road in the surroundings of the route to the destination, which is obtained by the route search performed by the map information providing apparatus 1, the distribution request information is generated which consists of the distribution request information header, the onboard information terminal identification information, the present position data indicating the present position obtained by the navigation processing, and the destination data indicating the position of the destination.

Besides the foregoing (41)-(46), when the user inputs from the input unit 20 a period that limits the newly opened time and road attribute changed time of the road to be acquired, the period data representing the period is added to the distribution request information. Furthermore, when the user instructs not to acquire the road stored in the storage unit 22, the road identification information indicated by the road identification information associating information stored in the storage unit 22 is added to the distribution request information as the unnecessary road designating data.

At step ST210, the distribution road information is obtained which includes the road identification information, coordinate point string data, road attribute information and accuracy information received from the map information providing apparatus 1 via the communication unit 23, or the distribution road information is obtained which includes the road identification information and road attribute information.

At step ST400, the following processing is performed on the distribution road information acquired at step ST210. More specifically, if the road identification information contained in the distribution road information is not registered either in the road identification information/road data associating information or in the road identification information associating information stored in the storage unit 22, a decision is made that it is unregistered; and if it is registered, a decision is made that it has already been registered. The decision processing at step ST400 corresponds to the registration deciding section in accordance with the present invention. As a result of the decision, if it is unregistered, the distribution road information is stored in the storage unit 22.

Figure 8:
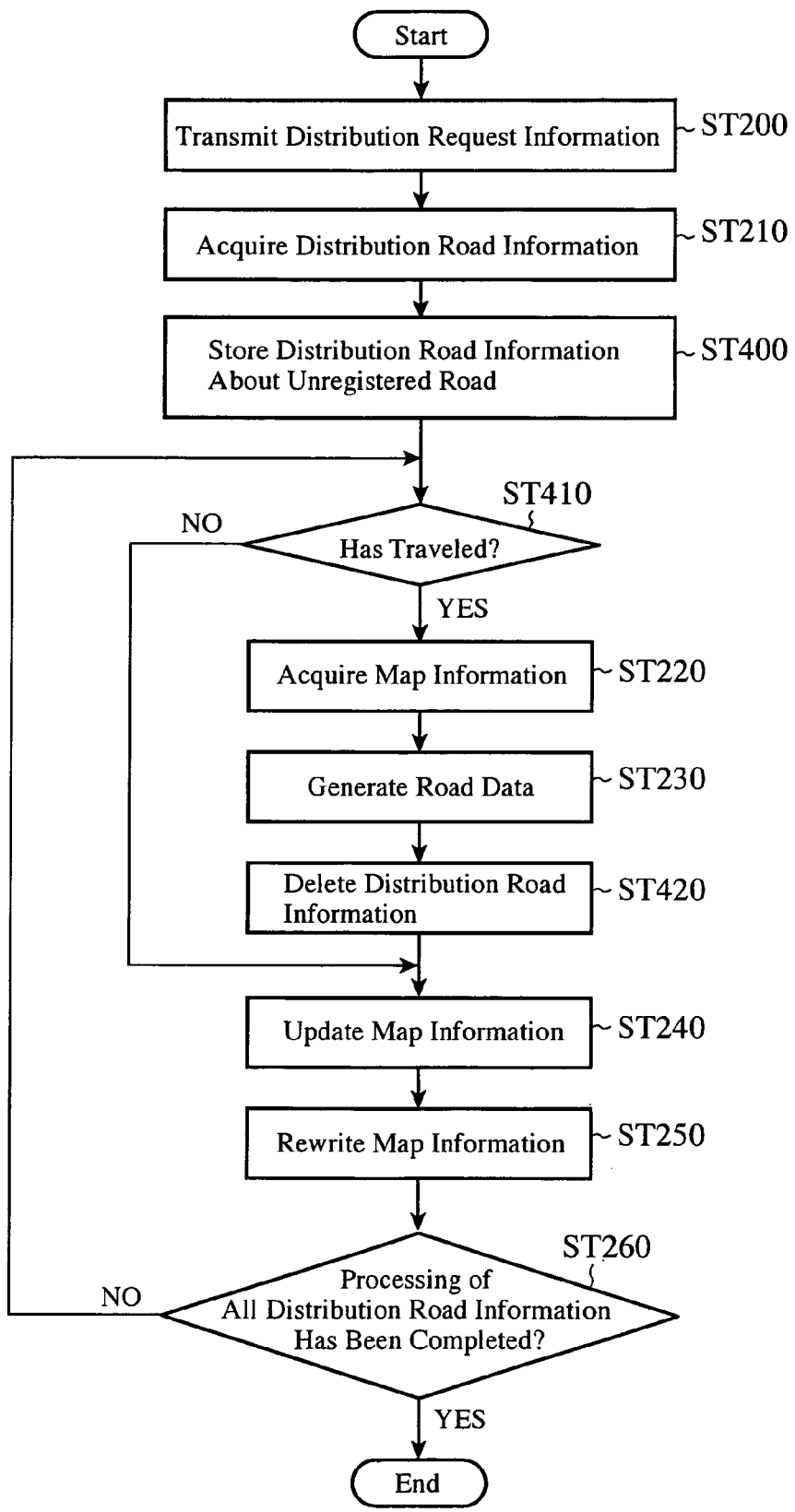
FIG. 8 is a flowchart illustrating the operation of the onboard information terminal of an embodiment 3 in accordance with the present invention.

At step ST230, among the distribution road information stored in the storage unit 22, concerning the distribution road information consisting of the distribution road information header, road identification information and road attribute information, the data representing the road attribute of the road data that is brought into correspondence with the road identification information by the road identification information/road data associating information stored in the storage unit 22 is altered in accordance with the road attribute information; and concerning the other distribution road information, the road data is generated through the same processing as that of step ST230 in the flowchart illustrated in FIG. 8 of the embodiment 3. In addition, the road identification information/road data associating information is generated which establishes correspondence between the road identification information contained in the distribution road information and the road data generated from the distribution road information, and is stored in the storage unit 22.

At step ST240, the same processing as that at step ST240 of the flowchart illustrated in FIG. 8 of the embodiment 3 is performed. In addition, the same processing generates the road identification information associating information which establishes correspondence between the road data and the road identification information that are added to the road information in the map information stored in the storage unit 22, and stores it in the storage unit 22.

As described above, according to the embodiment 5 in accordance with the present invention, since the map information providing apparatus 1 distributes the distribution road information with adding the road identification information to it, and the onboard information terminal 3 makes a registering decision using the road identification information acquired, it can make the decision processing more quickly. In addition, the present embodiment is configured in such a manner that when the road attribute alters, the map information providing apparatus 1 distributes the road identification information and the road attribute information, and the onboard information terminal 3 alters the road attribute of the road using the road identification information and the road attribute information acquired. Accordingly, the present embodiment can reduce the data size of the distribution road information, and reduce the communication time between the onboard information terminal 3 and the map information providing apparatus 1.

Furthermore, the present embodiment is configured in such a manner that the onboard information terminal 3 transmits the present position data indicating the desired area, the area data, the coordinate point string data representing the road, the road identification information indicating the road, and the data indicating the period required to the map information providing apparatus 1; and the map information providing apparatus 1 distributes the distribution road information about the corresponding road to the onboard information terminal 3. Thus, the present embodiment can distribute and obtain the distribution road information about the desired road. In addition, the present embodiment is configured in such a manner that as the information representing the road stored in the storage unit 22 of the onboard information terminal 3, the onboard information terminal 3 transmits its road identification information to the map information providing apparatus 1, and the map information providing apparatus 1 stops distributing the distribution road information about the corresponding road to the onboard information terminal 3. Thus, the present embodiment can prevent the distribution and acquisition of the distribution road information undesired and unrequired by the user.

Moreover, the present embodiment is configured in such a manner that the onboard information terminal 3 transmits the present position data indicating the present position and the destination data indicating the destination to the map information providing apparatus 1, and the map information providing apparatus 1 distributes the distribution road information about the road in the surroundings of the appropriate route between the present position and the destination acquired by the route search to the onboard information terminal 3. Accordingly, the present embodiment can distribute and acquire the distribution road information about the route to the destination and about the surroundings of the route.

Embodiment 6

The embodiment 6 in accordance with the present invention is a variation of the embodiment 5 modified in the following manner.

(3-1) Map Information Providing Apparatus 1

The configuration of the map information providing apparatus 1 is the same as that of the embodiment 5 shown in FIG.

10. The operation of the map information providing apparatus 1 of the embodiment 6 will be described below. The operation of the map information providing apparatus 1 of the embodiment 6 is carried out in accordance with the flowchart as illustrated in FIG. 11 that alters its step ST100 and ST140 as follows. In the following description, steps carrying out the same processing as the steps of the flowchart illustrated in FIG. 11 are designated by the same reference symbols used in FIG. 11, and their description will be omitted. Thus, only different portions will be described below.

At step ST100, the distribution road source information input from the distribution road input unit 12 includes, in addition to the information input in the embodiment 5, road name information for use in a road list, area identification information for use in an area list, and area name information for use in the area list. The road name information for use in the road list consists of a character string representing the road name used for selecting a desired road in the onboard information terminal 3. The area identification information for use in the area list consists of identification information for identifying the area including the road used for selecting a desired area in the onboard information terminal 3. The area name information for use in the area list consists of a character string representing the name of the area including the road used for selecting the desired area in the onboard information terminal 3, or consists of a code given to the area in advance.

At step ST140, if the list request state information in the distribution request information received from the onboard information terminal 3 via the communication unit 10 is in an invalid mode, the distribution road information is generated in the same processing as that of step ST140 in the flowchart illustrated in FIG. 11 used in the embodiment 5. If the list request state information in the distribution request information received from the onboard information terminal 3 via the communication unit 10 is in a "road list mode", the road list information is prepared which consists of a pair of the road identification information of the distribution road source information about the road selected at step ST600 and the road name information for use in the road list; and the distribution road information is generated which consists of the header for managing the distribution road information and of the road list information.

When the list request state information in the distribution request information received from the onboard information terminal 3 via the communication unit 10 is in an "area list mode", the area list information is prepared which consists of a pair of the area identification information of the distribution road source information about the road selected at step ST600 and the area name information for use in the area list; and the distribution road information is generated which consists of the header for managing the distribution road information and of the area list information.

After receiving the distribution request information containing the list request state information indicating the road list mode from the onboard information terminal 3 via the communication unit 10, if the distribution request information containing the list request state information indicating the road selecting mode is received from the same onboard information terminal 3, from among the distribution road source information about the road selected at step ST600 in the preceding processing, the distribution road information is generated by the same processing as that of step ST140 in the flowchart illustrated in FIG. 11 used in the embodiment 5 by using the distribution road source information having the same road identification information as the road identification information of the distribution request information received from the communication unit 10. Thus, the distribution road information about the road selected from the distributed road list by the onboard information terminal 3 is generated.

After receiving the distribution request information containing the list request state information indicating the area list mode from the onboard information terminal 3 via the communication unit 10, if the distribution request information containing the list request state information indicating the area selecting mode is received from the same onboard information terminal 3, from among the distribution road source information about the road selected at step ST600 in the preceding processing, the distribution road information is generated by the same processing as that of step ST140 in the flowchart illustrated in FIG. 11 used in the embodiment 5 by using the distribution road source information having the same area identification information as the area identification information of the distribution request information received from the communication unit 10. Thus, the distribution road information about the road contained in the area that is selected from the distributed area list by the onboard information terminal 3 is generated. The foregoing step ST140 and step ST150 of the flowchart illustrated in FIG. 11 used in the embodiment 5 correspond to the distribution road list providing section and distribution area list providing section in accordance with the present invention, respectively.

(3-2) Onboard Information Terminal 3

Figure 12:
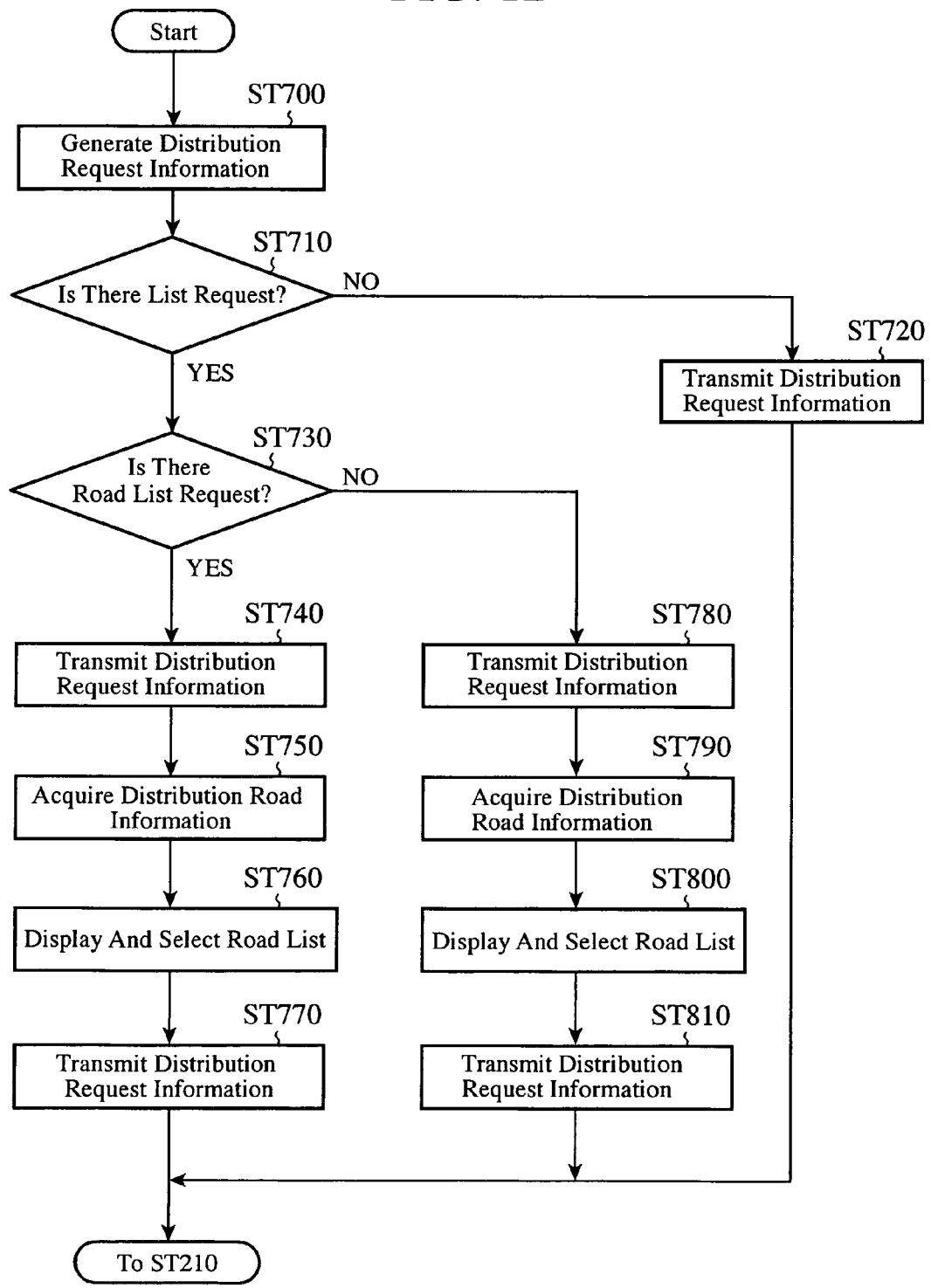
FIG. 12 is a flowchart illustrating the operation of the onboard information terminal of an embodiment 6 in accordance with the present invention.

The operation of the onboard information terminal 3 is carried out in accordance with the flowchart illustrated in FIG. 8. Only, the transmitting processing of the distribution request information at step ST200 in the flowchart illustrated in FIG. 8 is altered to the processing illustrated in the flowchart of FIG. 12. Referring to the flowchart illustrated in FIG. 12, the transmitting processing of the distribution request information will be described below.

In the transmitting processing of the distribution request information, the distribution request information is generated first (step ST700). At this step ST700, the distribution request information is generated by the same processing as that of step ST200 in FIG. 8 used in the embodiment 5. Subsequently, a check is made whether there is a list request or not (step ST710). More specifically, a check is made whether or not the instruction of the user input from the input unit 20 is the acquisition of the road list or area list.

At step ST710, unless a decision is made that the user instruction is the acquisition of either the road list or the area list, it is recognized that the distribution road information about the road to be distributed is obtained as in the embodiment 5, and the distribution request information is transmitted (step ST720). More specifically, the communication unit 23 transmits to the map information providing apparatus 1 the distribution request information including the distribution request information generated at step ST700 plus the list request state information to which a value indicating the invalid value is set. After that, the sequence proceeds to step ST210 of the flowchart illustrated in FIG. 8 to execute the same processing as that of the embodiment 5 thereafter.

At the foregoing step ST710, if a decision is made that the user instruction is the acquisition of either the road list or area list, a check is made subsequently whether the acquisition of the road list is requested or not (step ST730). More specifically, a check is made whether or not the user instruction input from the input unit 20 is an instruction to acquire the road list. At step ST730, if a decision is made that the acquisition of the road list is requested, the distribution request information is transmitted subsequently (step ST740). More specifically, the communication unit 23 transmits to the map information providing apparatus 1 the distribution request information including the distribution request information generated at step ST700 plus the list request state information to which the value indicating the road list request is set.

Subsequently, the distribution road information is acquired (step ST750). More specifically, waiting for the distribution road information transmitted from the map information providing apparatus 1, the onboard information terminal 3 obtains the distribution road information from the communication unit 23. The processing at the foregoing step ST740 and step ST750 corresponds to the distribution road list acquiring section in accordance with the present invention.

Subsequently, the road list display and selection is carried out (step ST760). More specifically, according to the road list information contained in the distribution road information acquired at step ST750, the output unit 25 displays the road name list on the screen. If the road name the user desires is instructed in the displayed road name list via the input unit 20, the road identification information is obtained from the road list information. The processing at step ST760 corresponds to the listed road selecting section in accordance with the present invention.

Subsequently, the distribution request information is transmitted (step ST770). More specifically, the distribution request information is generated which consists of the distribution request information header, onboard information terminal identification information, list request state information to which the value indicating the road selecting request is set, and road identification information obtained at step ST760; and the generated distribution request information is transmitted to the map information providing apparatus 1 by the communication unit 23. After that, the sequence proceeds to step ST210 of the flowchart illustrated in FIG. 8 to execute the same processing as that of the embodiment 5. The processing at step ST770 corresponds to the road request section in accordance with the present invention.

At the foregoing step ST730, if a decision is made that the acquisition of the area list is requested, the distribution request information is transmitted subsequently (step ST780). More specifically, the communication unit 23 transmits to the map information providing apparatus 1 the distribution request information including the distribution request information generated at step ST700 plus the list request state information to which the value indicating the area list request is set. Subsequently, the distribution road information is acquired (step ST790). More specifically, waiting for the distribution road information transmitted from the map information providing apparatus 1, the onboard information terminal 3 obtains the distribution road information from the communication unit 23. The processing at the foregoing step ST780 and step ST790 corresponds to the distribution area list acquiring section in accordance with the present invention.

Subsequently, the road list display and selection is carried out (step ST800). More specifically, according to the area list information contained in the distribution road information acquired at step ST790, the output unit 25 displays the area name list on the screen. If the area name the user desires is instructed in the displayed area name list via the input unit 20, the area identification information is obtained from the area list information. The processing at step ST800 corresponds to the listing area selecting section in accordance with the present invention.

Subsequently, the distribution request information is transmitted (step ST810). More specifically, the distribution request information is generated which consists of the distribution request information header, onboard information terminal identification information, list request state information to which the value indicating the area selecting request is set, and area identification information obtained at step ST800; and the generated distribution request information is transmitted to the map information providing apparatus 1 by the communication unit 23. After that, the sequence proceeds to step ST210 of the flowchart illustrated in FIG. 8 to execute the same processing as that of the embodiment 5. The processing at step ST810 corresponds to the area request section in accordance with the present invention.

As described above, the embodiment 6 in accordance with the present invention is configured in such a manner that the map information providing apparatus 1 distributes the road list in advance so as to enable the onboard information terminal 3 side to select the road to be acquired from the road list. Accordingly, the user can obtain the information about the desired road.

In addition, the present embodiment is configured in such a manner that the map information providing apparatus 1 distributes the area list in advance so as to enable the onboard information terminal 3 side to select the area to be acquired from the area list. Accordingly, the user can obtain the information about the road included in the desired area.

Embodiment 7

The map information providing system, map information providing apparatus 1 and onboard information terminal 3 of the embodiment 7 in accordance with the present invention have the same configurations as their counterparts of the foregoing embodiment 5 or embodiment 6.

Figure 13:
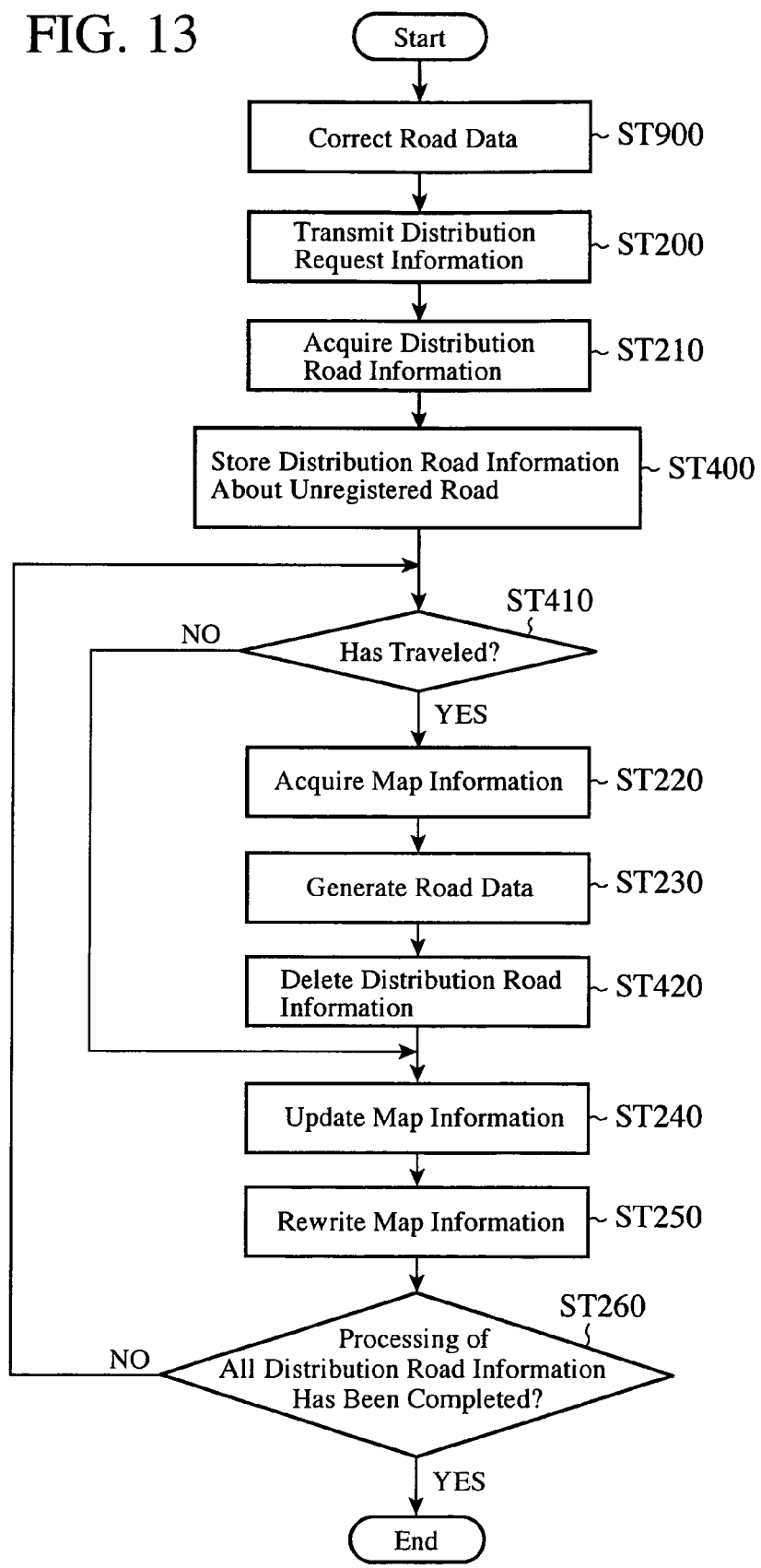
FIG. 13 is a flowchart illustrating the operation of the onboard information terminal of an embodiment 7 in accordance with the present invention.

The operation of the map information providing apparatus 1 of the embodiment 7 in accordance with the present invention is the same as that of the map information providing apparatus 1 of the foregoing embodiment 5 or embodiment 6. Thus, only the operation of the onboard information terminal 3 will be described with reference to the flowchart illustrated in FIG. 13. The flowchart illustrated in FIG. 13 consists of the flowchart illustrated in FIG. 8 plus step ST900. In the following description, steps carrying out the same processing as that of the flowchart illustrated in FIG. 8 are designated by the same reference symbols as those of FIG. 8, and their description will be simplified with placing the focus on the additional portion.

At step ST900, revision of the road data is executed. More specifically, the processor 24 checks the road data stored in the storage unit 22, compares the traveled course data stored in the storage unit 22 with the data representing the road configuration in the road data, and searches for the road data that agrees within tolerance limits or agrees partially. As a result, if the road data that agrees is found, the traveling direction of the vehicle, that is, the sequence of the coordinate points of the traveled course data is compared with the direction of the road indicated by the road data, that is, the sequence of the coordinate points representing the road configuration in the road data; and if they agree, a decision is made that the road is passable in the same direction as the direction of the road; and unless they agree, a decision is made that the road is passable in the direction opposite to the direction of the road. Then, unless the decision result agrees with the traffic regulation indicated by the traffic regulation information in the road data, the traffic regulation information is revised as indicated by the decision result; the entrance and exit direction of the road is obtained from the traveled course data; and the traffic regulation information of the road data includes entrance or exit regulation as to the direction, the entrance and exit regulations in the traffic regulation information are canceled.

As a result of the foregoing processing, if the road data that partially agrees is found, portions other than the portion that partially agrees in the data representing the road configuration in the road data are revised to the values of the corresponding coordinate points of the traveled course data. The processing at step ST900 corresponds to the road data revising section in accordance with the present invention.

As described above, the embodiment 7 in accordance with the present invention is configured in such a manner as to revise the road data on a basis of the traveled course data representing the traveling state of the vehicle. Thus, it can obtain the map information matching the actual state of the road.

Embodiment 8

Figure 14:
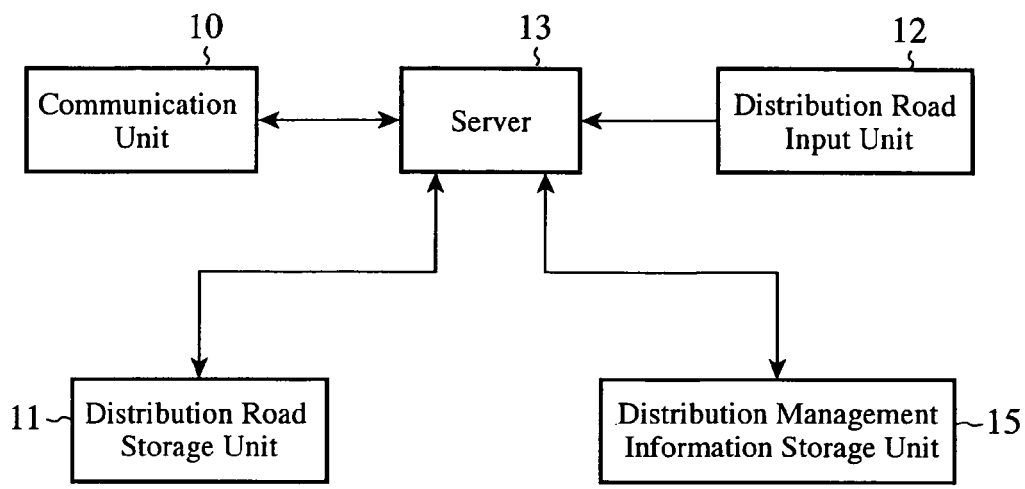
FIG. 14 is a block diagram showing a configuration of the map information providing apparatus of an embodiment 8 in accordance with the present invention.

FIG. 14 is a block diagram showing a configuration of the map information providing apparatus 1 of the embodiment 8. The map information providing apparatus 1 comprises the map information providing apparatus 1 of the embodiment 1 and a distribution management information storage unit 15 added thereto. The distribution management information storage unit 15 stores distribution management information for managing a road whose information has already been distributed to the onboard information terminal 3. The distribution management information storage unit 15 corresponds to the distribution completed road storing section in accordance with the present invention.

Figure 5:
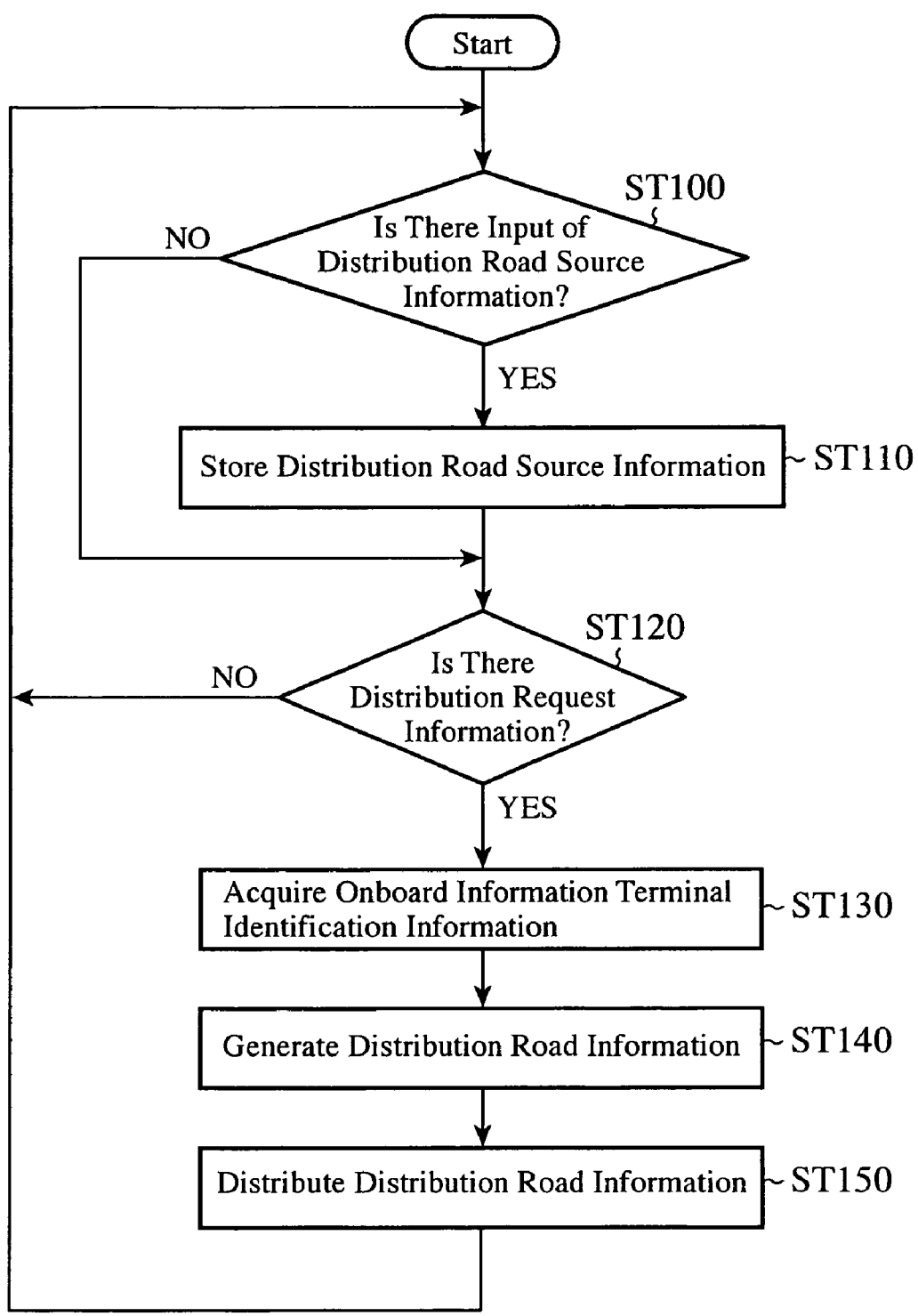
FIG. 5 is a flowchart illustrating the operation of the map information providing apparatus of the embodiment 1 in accordance with the present invention.

The operation of the map information providing apparatus 1 is the same as that of the information providing apparatus of the embodiment 1 whose operation is illustrated in the flowchart of FIG. 5. More specifically, at step ST140 in the flowchart illustrated in FIG. 5, with reference to the distribution management information stored in the distribution management information storage unit 15, a check is made as to the distribution management information corresponding to the onboard information terminal identification information of the distribution request information received from the onboard information terminal 3 via the communication unit 10; and among the distribution road source information stored in the distribution road storage unit 11, only for the road identification information of the distribution road source information, which is not registered as the distribution management information, the distribution road information is generated by the same processing as that of step ST140 in the flowchart illustrated in FIG. 5. In addition, the generated road identification information of the distribution road source information is registered in the distribution management information.

As described above, the embodiment 8 in accordance with the present invention is configured in such a manner as to register the road identification information about the road whose distribution has been completed into the distribution management information stored in the distribution management information storage unit 15; and to prevent generating the distribution road information about the road whose road identification information is registered in the distribution management information. Thus, the present embodiment can prevent the same distribution road information about the road from being distributed to the same onboard information terminal 3 a number of times.

Embodiment 9

The embodiment 9 in accordance with the present invention is configured in such a manner that the onboard information terminal 3 of the foregoing embodiments 1-8 updates, when it travels an unregistered road that is not registered in the map information stored in the storage unit 22, the map information stored in the storage unit 22 on the basis of the traveled course data stored in the storage unit 22. The processing to implement this function is referred to as an "independent map update section", and its processing is carried out in parallel with the processing and navigation processing performed in the onboard information terminal 3 of the foregoing embodiments 1-8.

Figure 17:
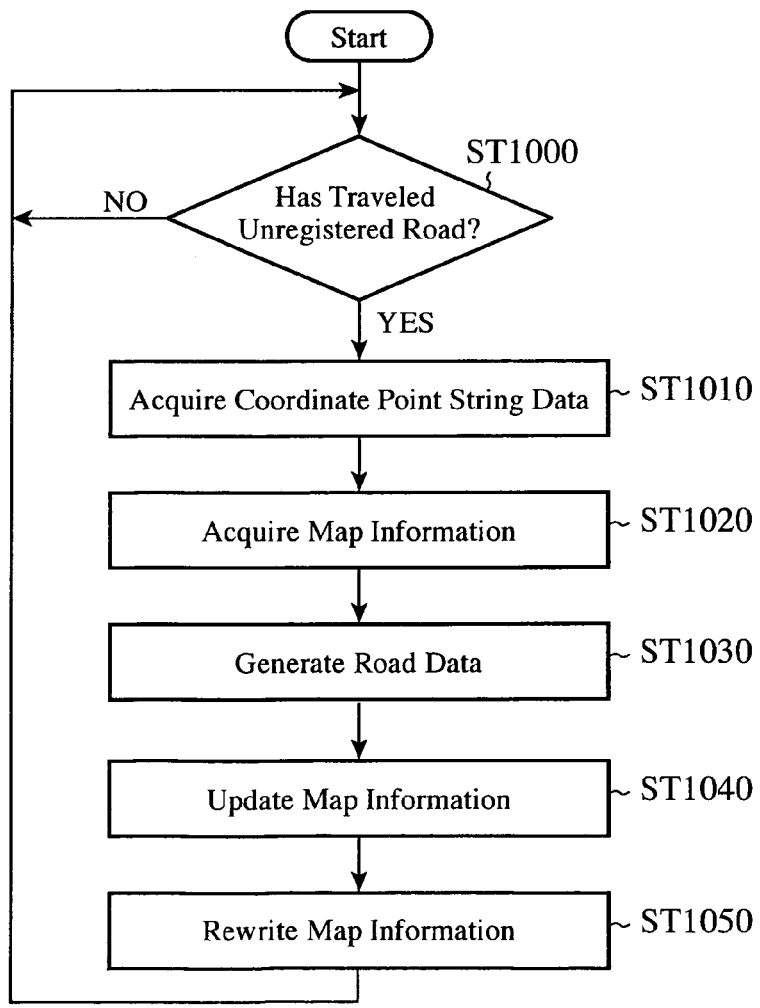
FIG. 17 is a flowchart illustrating the operation of the onboard information terminal of an embodiment 9 in accordance with the present invention.

FIG. 17 is a flowchart illustrating the processing executed by the processor 24 to implement the independent map update section. The independent map update section checks whether the vehicle travels the unregistered road or not first (step ST1000). More specifically, using the map matching of the navigation processing, a check is made whether the vehicle travels a road (unregistered road) other than the roads registered in the map information stored in the storage unit 22. At step ST1000, if a decision is made that the vehicle has not yet traveled the unregistered road, this step ST1000 is executed repeatedly, thereby entering a standby mode.

In contrast, if a decision is made at step ST1000 that the vehicle has traveled the unregistered road, the coordinate point string data is acquired (step ST1010). More specifically, from the traveled course data stored in the storage unit 22, the coordinate point string data of the traveled portion other than the roads registered in the map information stored in the storage unit 22 is acquired. Subsequently, the map information is acquired (step ST1020). More specifically, the map information about the region including the coordinate points of the coordinate point string data acquired at step ST1010 is obtained from the storage unit 22 into the internal memory of the processor 24.

Subsequently, the road data is generated (step ST1030). More specifically, from the coordinate point string data obtained at step ST1010 and from the map information obtained at step ST1020, the road data is generated which has the same data format at least in part as the road data generated in the embodiments 1-8 by the same processing as that of step ST230 in the flowchart illustrated in FIG. 6 used in the embodiment 1.

Subsequently, the map information is updated (step ST1040). More specifically, according to the road data generated at step ST1030, the map information obtained at step ST1020 is updated by the same processing as that of step ST240 in the flowchart illustrated in FIG. 6 used in the embodiment 1. Subsequently, the map information is rewritten (step ST1050). More specifically, the map information stored in the storage unit 22 is rewritten to the updated map information that is obtained at step ST1040 and is stored in the internal memory of the processor 24. After that, the sequence returns to step ST1000 to repeat the foregoing processing.

As described above, the embodiment 9 in accordance with the present invention has the independent map update section. Accordingly, as soon as the vehicle travels the unregistered road, the onboard information terminal 3 can update the map information without waiting for the distribution road information about the road not registered in the storage unit 22 in the onboard information terminal 3 to be input from the distribution road input unit 12 in the map information providing apparatus 1.

In addition, the road data generated in the embodiment 8 has the same data format at least in part as the road data generated in the embodiments 1-8. Accordingly, the program of the processor 24 for generating the road data can be used in common.

Incidentally, although the foregoing embodiments 1-4 and 9 are configured in such a manner as to obtain the distribution road information from the map information providing apparatus 1 via the communication network 2, this is not essential. For example, a configuration is also possible which stores the distribution road information in a storage medium like a memory card in advance, and obtains the distribution road information from the storage medium.

In addition, although the foregoing embodiments 1-7 and 9 are configured in such a manner that the map information providing apparatus 1 and the onboard information terminal 3 carry out communications via the communication network 2, this is not essential. For example, a configuration is also possible which distributes the distribution road information from the map information providing apparatus 1 to the onboard information terminal 3 using broadcasting such as terrestrial digital television broadcasting.

Furthermore, although the foregoing embodiments 1-9 are configured in such a manner that the map information providing apparatus 1 and the onboard information terminal 3 carry out communications via the communication network 2, this is not essential. For example, a configuration is also possible which interposes a distribution terminal utilizing a DSRC (Dedicated Short Range Communication), wireless LAN (Local Area Network) or the like between the map information providing apparatus 1 and the onboard information terminal 3 to carry out communications.

In addition, although the foregoing embodiments 1-9 are configured in such a manner that the processor 24 of the onboard information terminal 3 starts updating the map information when the user of the onboard information terminal 3 inputs the instruction to acquire the distribution road information from the input unit 20, this is not essential. For example, a configuration is also possible which starts updating the map information regularly or when the engine of the vehicle is started. Furthermore, a configuration is also possible which starts it when the map matching fails in the navigation operation, and when it becomes clear that the vehicle travels a road not registered in the map information stored in the storage unit 22. Besides, when the onboard information terminal 3 carries out communications with the map information providing apparatus 1 via the distribution terminal, a configuration is also possible which starts updating the map information when the vehicle enters an area enabling communication with the distribution terminal.

Furthermore, although the foregoing embodiments 1-9 are configured in such a manner that the map information providing apparatus 1 distributes the distribution road information about a road the onboard information terminal 3 is unlikely to possess, this is not essential. For example, a configuration is also possible in which the map information providing apparatus 1 distributes the road identification information and the coordinate point string data about an abolished road as the distribution road information, and the onboard information terminal 3 obtains the distribution road information consisting of the road identification information and the coordinate point string data about an abolished road, and prevents the abolished road from being used for the navigation processing.

In addition, although the foregoing embodiments 1-9 are configured in such a manner as to rewrite the map information stored in the storage unit 22 to the map information generated by the map information update section, this is not essential. For example, a configuration is also possible which has the map information update section generate, when the map information is necessary, new map information in the internal memory of the processor 24 from the road data and the map information stored in the storage unit 22 without rewriting the map information stored in the storage unit 22, and which uses the map information stored in the internal memory of the processor 24. In this case, a configuration is possible which stores the map information in an unrewritable storage medium such as a DVD-ROM (Digital Versatile Disk-Read Only Memory).

Furthermore, although the foregoing embodiment 5 is configured in such a manner as to store the road data in the storage unit 22, this is not essential. For example, a configuration is also possible which prevents, after the map information update section generates the new map information, the road data used for generating the new map information from being stored in the storage unit 22.

In addition, although the foregoing embodiment 6 is configured in such a manner as to provide the list of the area names as the distribution area list, this is not essential. For example, a configuration is also possible which provides a coordinate point string representing the configuration of the area instead of the area names, and displays the area on the screen of the output unit 25 for the user to select a desired area.

Furthermore, although the foregoing embodiments 1-9 are configured in such a manner that at step ST230 and step ST1030, the individual data constituting the road data have the same data format at least in part as the data format of the road information stored in the storage unit 22, this is not essential. For example, a configuration is also possible in which the data formats can differ, but the map update section converts the individual data constituting the road data in such a manner that they agree at least in part with the data format of the road information.

In addition, although the foregoing embodiments 1-9 are configured in such a manner as to update, at step ST240 and step ST1040, the map information using the road data generated at step ST230 and step ST1030, this is not essential. For example, a configuration is also possible which prepares update procedure data representing a procedure for updating the map information at step ST240 and step ST1040 such as to which portion of the map data the road data is to be added or inserted, and which portion of the map information and how it should be updated to connect the road registered in the map information to the road indicated by the road data; and updates the map information in accordance with the update procedure data. Besides, a configuration is also possible which stores the update procedure data in the storage unit 22. In addition, a configuration is also possible which handles a set of the road data and the update procedure data as the road data.

Furthermore, although the foregoing embodiment 2 is configured in such a manner as to generate the road data about the road not registered in the storage unit 22, this is not essential. For example, even if the road is registered in the storage unit 22, if the accuracy of the road is worse, a configuration is also possible which generates the road data of the road.

In addition, although the foregoing embodiment 2 is configured in such a manner as to generate the road data about the road not registered in the storage unit 22, this is not essential. For example, if the road is the road registered in the storage unit 22 in the embodiment 9, a configuration is also possible which generates the road data about the road.

Furthermore, although the foregoing embodiments 3 and 5 are configured in such a manner as to store the distribution road information about the road not stored in the storage unit 22 into the storage unit 22, this is not essential. For example, even if the road is registered in the storage unit 22, if the accuracy of the road is worse, a configuration is possible which stores the distribution road information about the road in the storage unit 22.

In addition, although the foregoing embodiments 3 and 5 are configured in such a manner as to store the distribution road information about the road not registered in the storage unit 22 into the storage unit 22, this is not essential. For example, if the road is the road registered in the storage unit 22 in the embodiment 9, a configuration is also possible which stores the distribution road information about the road in the storage unit 22.

Furthermore, in the foregoing embodiment 5, a configuration is also possible which causes the distribution road information to include the road identification information about the road to be connected to the road represented by the distribution road information.

INDUSTRIAL APPLICABILITY

As described above, the onboard information terminal and the map information providing apparatus and the map information providing system using them in accordance with the present invention are configured in such a manner that they can update the map data regardless of the data format of the map information by causing the map information providing apparatus to distribute the coordinate point string data, and the onboard information terminal to generate the road data from the received coordinate point string data in accordance with the data format it possesses. Therefore they are suitable to be applied as the onboard information terminal and the map information providing apparatus and the map information providing system using them which are employed in an onboard navigation apparatus that exchanges information with a server via a communication network.

What is claimed is:

1. An onboard information terminal comprising:
a map information storing section for storing at least road data;
a distribution information acquiring section for obtaining, from outside, distribution road information containing coordinate point string data consisting of a series of coordinate points indicating geographical positions;
a road data generating section for generating, in the same format at least in part as the road data stored in the map information storing section, a new road data for adding a new road to a road network, which is represented by the road data stored in said map information storing section, from the coordinate point string data contained in the distribution road information obtained by said distribution information acquiring section; and
a map information update section for generating new map information from the new road data generated by said road data generating section and the road data stored in said map information storing section; wherein
the road data generation section makes a decision whether the new road data connects with the road data stored in the map information storing section or not, and if the road data generation section decide that the new road data connects with the road data stored in the map information storing section, the map information update section adds connection relationship with the new road to the road data stored in the map information storing section.

2. The onboard information terminal according to claim 1, further comprising:
a distribution road information storing section for storing the distribution road information obtained by said distribution information acquiring section, wherein
said road data generating section generates the new road data from the coordinate point string data contained in the distribution road information stored in said distribution road information storing section.

3. The onboard information terminal according to claim 1, further comprising:
a registration deciding section for making a decision, when the road represented by the distribution road information obtained by said distribution information acquiring section is not stored in said map information storing section, that the road is unregistered, and when the road is stored, that the road is registered, wherein
said road data generating section generates, only when said registration deciding section makes a decision that the road represented by the distribution road information is unregistered, the new road data from the coordinate point string data contained in the distribution road information obtained by said distribution information acquiring section.

4. The onboard information terminal according to claim 1, further comprising:
a traveling deciding section for making a decision as to whether the road represented by the distribution road information obtained by said distribution information acquiring section has been traveled or not, wherein
said road data generating section generates, when said traveling deciding section makes a decision of traveling the road, the new road data from the coordinate point string data contained in the distribution road information obtained by said distribution information acquiring section.

5. The onboard information terminal according to claim 1, further comprising:
a road data storing section for storing the new road data generated by said road data generating section, wherein
said map information update section generates new map information by combining the road data stored in said road data storing section and the road data stored in said map information storing section.

6. The onboard information terminal according to claim 1, further comprising:
a road data storing section for storing the new road data generated by said road data generating section;
a registration deciding section for making a decision, when the road represented by the distribution road information obtained by said distribution information acquiring section is not stored in said map information storing section, that the road is unregistered, and when the road is stored, that the road is registered; and
a traveling deciding section for making a decision as to whether the road represented by the distribution road information obtained by said distribution information acquiring section has been traveled or not.

7. The onboard information terminal according to claim 3, further comprising:
a distribution road information storing section for storing the distribution road information obtained by said distribution information acquiring section, wherein only when said registration deciding section makes a decision that the road represented by the distribution road information acquired by said distribution information acquiring section is unregistered, the distribution road information is stored in said distribution road information storing section.

8. The onboard information terminal according to claim 6, wherein said road data generating section generates the new road data from the coordinate point string data of the distribution road information when said traveling deciding section makes a decision that the road has been traveled which is represented by the distribution road information obtained by said distribution information acquiring section.

9. The onboard information terminal according to claim 6, further comprising:

a distribution road information storing section for storing the distribution road information obtained by said distribution information acquiring section, wherein when said road data generating section generates the new road data, the distribution road information is deleted which corresponds to the new road data generated from the distribution road information stored in said distribution road information storing section.

10. The onboard information terminal according to claim 1, wherein said distribution information acquiring section obtains the distribution road information containing accuracy information that represents accuracy of the coordinate point string data.

11. The onboard information terminal according to claim 1, further comprising:

a registration deciding section for making a decision, when the road represented by the distribution road information obtained by said distribution information acquiring section is not stored in said map information storing section, that the road is unregistered, and when the road is stored, that the road is registered; wherein said distribution information acquiring section obtains the distribution road information containing road identification information for identifying a road; and said registration deciding section makes a decision, when the road identification information of the road represented by the distribution road information disagrees with the road identification information of any road stored in said map information storing section, that the road is unregistered, and when they agree, that the road is registered.

12. The onboard information terminal according to claim 1, wherein said distribution information acquiring section obtains the distribution road information that contains road attribute information and road identification information for identifying a road, and a road attribute of the road represented by the road identification information contained in the distribution road information obtained by said distribution information acquiring section is altered in accordance with the road attribute information of the distribution road information obtained by said distribution information acquiring section.

13. The onboard information terminal according to claim 1, further comprising:

a distribution information request section for transmitting, to outside, distribution request information containing at least one of present position data indicating a present position, area data indicating an area including a desired road, road designating data indicating a road to be designated for indicating a desired area, unnecessary road designating data indicating an undesired road, destination data indicating a destination, and period data indicating a desired period.

14. The onboard information terminal according to claim 1, further comprising:

a distribution road list acquiring section for acquiring a distribution road list containing roads distributed from outside;

a listed road selecting section for selecting a desired road from the distribution road list obtained by said distribution road list acquiring section; and a road request section for requesting to outside to acquire the distribution road information about the road selected by said listed road selecting section.

15. The onboard information terminal according to claim 1, further comprising:

a distribution area list acquiring section for acquiring a distribution area list containing areas including roads distributed from outside;

a listed area selecting section for selecting a desired area from the distribution area list obtained by said distribution area list acquiring section; and an area request section for requesting to outside to acquire the distribution road information about a road in the area selected by said listed area selecting section.

16. The onboard information terminal according to claim 6, further comprising:

a road data revising section for revising the road stored in said road data storing section on a basis of traveled course data representing a traveling state.

17. A map information providing apparatus comprising:

a distribution request information acquiring section for obtaining distribution request information which is transmitted from outside and contains one of present position data indicating a present position, area data indicating an area including a desired road, and road designating data indicating a road to be designated for indicating a desired area;

a distribution road storing section for storing coordinate point string data representing a newly established road;

a distribution road selecting section for selecting, as a road represented by the coordinate point string data stored in said distribution road storing section, one of a road in surroundings of the position indicated by the present position data, a road included in the area indicated by the area data and a road in surroundings of the road indicated by the road designating data according to the distribution request information obtained by said distribution request information acquiring section, and for obtaining the coordinate point string data of the road selected; and a road information distribution section for distributing to outside the distribution road information containing the coordinate point string data about the road selected by said distribution road selecting section.

18. The map information providing apparatus according to claim 17, wherein said distribution road storing section stores the coordinate point string data representing the newly established road, and road identification information for identifying the road; and said road information distribution section distributes to the outside the distribution road information containing the coordinate point string data about the road selected by said distribution road selecting section and the road identification information.

19. The map information providing apparatus according to claim 17, wherein when said distribution request information acquiring section obtains the distribution request information containing road identification information that designates unnecessary road designating data indicating an undesired road, said distribution road selecting section does not select the road indicated by the unnecessary road designating data.

20. The map information providing apparatus according to claim 17, further comprising:

a distribution completed road storing section for storing, for each distribution destination, information as to whether the distribution road information containing the coordinate point string data about the road stored in said distribution road storing section has been distributed to the outside or not, wherein said distribution road selecting section selects a road to which the distribution road information is to be distributed from roads to which the distribution road information has not yet been distributed in accordance with contents stored in said distribution completed road storing section.

21. The map information providing apparatus according to claim 17, further comprising:

a providing side map information storing section for storing map information; and a route search section for searching for an appropriate route from a starting point to a destination using the map information stored in said providing side map information storing section, the starting point being indicated by present position data contained in the distribution request information obtained by said distribution request information acquiring section, and the destination being indicated by destination data contained in the distribution request information obtained by said distribution request information acquiring section, wherein said distribution road selecting section selects from roads stored in said distribution road storing section a road in surroundings of the route searched by said route search section.

22. The map information providing apparatus according to claim 17, further comprising:

a distribution road list providing section for providing the outside with a distribution road list exhibiting a list of roads selected by said distribution road selecting section.

23. The map information providing apparatus according to claim 21, further comprising:

a distribution area list providing section for providing the outside with a distribution area list exhibiting a list of areas including roads selected by said distribution road selecting section.

\* \* \* \* \*

UNITED STATES PATENT AND TRADEMARK OFFICE
CERTIFICATE OF CORRECTION

| | |
|---|---|
| PATENT NO. | : 7,890,251 B2 |
| APPLICATION NO. | : 11/990761 |
| DATED | : February 15, 2011 |
| INVENTOR(S) | : Tomohiro Nakae et al. |

It is certified that error appears in the above-identified patent and that said Letters Patent is hereby corrected as shown below:

IN THE CLAIMS:

Claim 23, second line thereof (at column 34, line 24), change "claim 21" to --claim 17--.

Signed and Sealed this
Tenth Day of May, 2011

David J. Kappos
*Director of the United States Patent and Trademark Office*